(12) United States Patent
Abarzadeh et al.

(10) Patent No.: US 12,119,771 B2
(45) Date of Patent: Oct. 15, 2024

(54) SINGLE CARRIER PULSE WIDTH MODULATOR FOR 5-LEVEL CONVERTER WITH CAPACITOR VOLTAGE SELF-BALANCING, EQUAL LOSS DISTRIBUTION, AND IMPROVED OUTPUT VOLTAGE SPECTRUM

(71) Applicant: SOCOVAR, SOCIÉTÉ EN COMMANDITE, Québec (CA)

(72) Inventors: Mostafa Abarzadeh, Montréal (CA); Kamal Al-Haddad, Montréal (CA)

( * ) Notice: Subject to any disclaimer, the term of this patent is extended or adjusted under 35 U.S.C. 154(b) by 130 days.

(21) Appl. No.: 18/000,476

(22) PCT Filed: Jun. 12, 2020

(86) PCT No.: PCT/CA2020/050818
§ 371 (c)(1),
(2) Date: Dec. 1, 2022

(87) PCT Pub. No.: WO2021/248223
PCT Pub. Date: Dec. 16, 2021

(65) Prior Publication Data
US 2023/0223886 A1 Jul. 13, 2023

(51) Int. Cl.
*H02P 1/00* (2006.01)
*H02M 1/00* (2006.01)
*H02M 1/12* (2006.01)
*H02M 7/04* (2006.01)
*H02M 7/217* (2006.01)
(Continued)

(52) U.S. Cl.
CPC .......... *H02P 27/14* (2013.01); *H02M 1/0095* (2021.05); *H02M 1/12* (2013.01); *H02M 7/05* (2021.05); *H02M 7/217* (2013.01); *H02M 7/4837* (2021.05); *H02M 7/487* (2013.01); *H02M 7/5395* (2013.01)

(58) Field of Classification Search
CPC ....... H02P 27/14; H02M 7/05; H02M 7/4837; H02M 1/0095
USPC .......................................................... 318/504
See application file for complete search history.

(56) References Cited

U.S. PATENT DOCUMENTS

| 9,374,033 | B2 * | 6/2016 | Oda | H02M 7/487 |
| 2020/0021207 | A1 * | 1/2020 | Donat | H02M 7/003 |
| 2024/0097550 | A1 * | 3/2024 | Rosado | H02M 7/483 |

OTHER PUBLICATIONS

International application No. PCT/CA2020/050818 International Preliminary Report on Patentability Chapter II dated Dec. 2, 2021.
(Continued)

*Primary Examiner* — Erick D Glass
(74) *Attorney, Agent, or Firm* — Anglehart et al.

(57) ABSTRACT

The present disclosure provides a method and apparatus using a novel PWM switching technique that requires only one PWM carrier signal and benefits from two logic functions to provide switching signals and provides the flying capacitor (FC) voltage as well as dc-link capacitors voltages regulated to their desired values without external control. It may also, eliminate the odd multiples of the switching harmonic clusters from the output voltage is possible; double the frequency of first switching harmonic; reduce filtering efforts may be required since the values of the output LC filter inductor and capacitor can be very much reduced. Furthermore, notable reduction in control complexity is possible using the novel PWM method.

15 Claims, 15 Drawing Sheets

(51) Int. Cl.
  H02M 7/483   (2007.01)
  H02M 7/487   (2007.01)
  H02M 7/5395  (2006.01)
  H02P 1/28    (2006.01)
  H02P 3/00    (2006.01)
  H02P 27/14   (2006.01)

(56) References Cited

OTHER PUBLICATIONS

International application No. PCT/CA2020/050818 International Search Report dated Feb. 23, 2021.
International application No. PCT/CA2020/050818 Search Strategy dated Feb. 23, 2021.
International application No. PCT/CA2020/050818 Written Opinion of the International Searching Authority dated Feb. 23, 2021.
Abazadeh et al., "Novel Simplified Single Carrier PWM Method for 5L ANPC Converter with Capacitor Voltage Self-Balancing and Improved Output Voltage Spectrum," 2019 IEEE 28th, International Symposium on Industrial Electronics (ISIE), Vancouver, Canada, Aug. 1, 2019, pp. 2021-2026.
Wang et al., "Capacitor Voltage Balancing of a Five-Level ANPC Converter Using Phase-Shifted PWM," IEEE Transactions on Power Electronics, vol. 30, No. 3, pp. 1147-1156, 2015.
Abarzadeh et al., "A modified static ground power unit based on active natural point clamped converter," in 2015 IEEE Energy Conversion Congress and Exposition (ECCE), 2015, pp. 3508-3514.
J. Rodriguez et al., "Multilevel Voltage-Source-Converter Topologies for Industrial Medium-Voltage Drives," IEEE Transactions on Industrial Electronics, vol. 54, No. 6, pp. 2930-2945, 2007.
J. Rodriguez et al., "Multilevel inverters: a survey of topologies, controls, and applications," IEEE Transactions on Industrial Electronics, vol. 49, No. 4, pp. 724-738, 2002.
M. Abarzadeh et al., "A Static Ground Power Unit Based on the Improved Hybrid Active Neutral-Point-Clamped Converter," IEEE Transactions on Industrial Electronics, vol. 63, No. 12, pp. 7792-7803, 2016.
R. Katebi et al., "Investigation of Fault Tolerant Capabilities in an Advanced Three-Level Active T-Type Converter," IEEE Journal of Emerging and Selected Topics in Power Electronics, pp. 1-1, 2018.
J. Rodriguez et al., "A Survey on Neutral-Point-Clamped Inverters," IEEE Transactions on Industrial Electronics, vol. 67, No. 7, pp. 2219-2230, 2010.
M. Abarzadeh et al., "A Modified Static Ground Power Unit Based on Novel Modular Active Neutral Point Clamped Converter," IEEE Transactions on Industry Applications, vol. 52, No. 5, pp. 4243-4256, 2016.
H. R. Teymour et al., "Novel modulation and control strategy for five-level ANPC converter with unbalanced DC voltage applied to a single-phase grid connected PV system," in 2013 IEEE Industry Applications Society Annual Meeting, 2013, pp. 1-8.
H. R. Teymour et al., "A Novel Modulation Technique and a New Balancing Control Strategy for a Single-Phase Five-Level ANPC Converter," IEEE Transactions on Industry Applications, vol. 51, No. 2, pp. 1215-1227, 2015.
R. Katebi et al., "An Advanced Three-Level Active Neutral-Point-Clamped Converter With Improved Fault-Tolerant Capabilities," IEEE Transactions on Power Electronics, vol. 33, No. 8, pp. 6897-6909, 2018.
M. Abarzadeh et al., "Enhanced static ground power unit based on flying capacitor based h-bridge hybrid activeneutral-point-clamped converter," IET Power Electronics, vol. 9, No. 12, pp. 2337-2349, 2016.
N. Sandeep et al., "Operation and Control of an Improved Hybrid Nine-Level Inverter," IEEE Transactions on Industry Applications, vol. 53, No. 6, pp. 5676-5686, 2017.
M. Abarzadeh et al., "An Improved Active-Neutral-Point-Clamped Converter With New Modulation Method for Ground Power Unit Application," IEEE Transactions on Industrial Electronics, vol. 66, No. 1, pp. 203-214, 2019.
P. Barbosa et al., "Active Neutral-Point-Clamped Multilevel Converters," in 2005 IEEE 36th Power Electronics Specialists Conference, 2005, pp. 2296-2301.
J. I. Leon et al., "Simple modulator with voltage balancing control for the hybrid five-level flyingcapacitor based ANPC converter," in 2011 IEEE International Symposium on Industrial Electronics, 2011, pp. 1887-1892.
Oikonomou et al., "Model Predictive Pulse Pattern Control for the Five-Level Active Neutral-Point-Clamped Inverter," IEEE Transactions on Industry Applications, vol. 49, No. 6, pp. 2583-2592, 2013.
Kieferndorf et al., "Model predictive control of the internal voltages of a five-level active neutral point clamped converter," in 2012 IEEE Energy Conversion Congress and Exposition (ECCE), 2012, pp. 1676-1683.
Abarzadeh et al., "An Improved Model Predictive Controller for Five-Level Active-Neutral-Point-Clamped Converter," in 2018 IEEE Electrical Power and Energy Conference (EPEC), 2018, pp. 1-6.
F. Kieferndorf et al., "ANPC-5L technology applied to medium voltage variable speed drives applications," in SPEEDAM 2010, 2010, pp. 1718-1725. (Abstract provided).
S. Busquets-Monge et al., "A Multilevel Active-Clamped Converter Topology—Operating Principle," IEEE Transactions on Industrial Electronics, vol. 58, No. 9, pp. 3868-3878, 2011. (Abstract provided).
Liu et al., "A Novel SVPWM Algorithm for Five-Level Active Neutral-Point-Clamped Converter," IEEE Transactions on Power Electronics, vol. 31, No. 5, pp. 3859-3866, 2016. (Abstract provided).
Li et al., "Hybrid Modulation Concept for Five-Level Active-Neutral-Point-Clamped Converter," IEEE Transactions on Power Electronics, vol. 32, No. 12, pp. 8958-8962, 2017. (Abstract provided).

* cited by examiner

*C1 Charging*

*C1 Discharging*

SINGLE CARRIER PULSE WIDTH MODULATOR FOR 5-LEVEL CONVERTER WITH CAPACITOR VOLTAGE SELF-BALANCING, EQUAL LOSS DISTRIBUTION, AND IMPROVED OUTPUT VOLTAGE SPECTRUM

TECHNICAL FIELD

The present relates to the field of electrical converters. More specifically this disclosure relates to the field of power converters using electronic switches.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Adjustable speed drives (ASD) are used to control the speed of electric motor machinery. Many industrial processes such as assembly lines must operate at different speeds for different products. Where process conditions demand adjustment of flow from a pump or fan, varying the speed of the drive may save energy compared with other techniques for flow control.

In recent years, multi-level converters (MLC) are widely applied to various applications such as Adjustable Speed Drive (ASD) due to its modularity and higher reliability. However, the major drawbacks of the MLC-based ASD are complicated control and modulation system, requiring closed loop controller to balance the capacitors voltages of the MLC, higher voltage ripple of the capacitors at low speeds, and non-equal loss distribution among power devices.

As power electronic converters' state-of-the-art technology has advanced in recent years, MLCs are becoming more widely employed in various industrial applications, as described in references [1-4] (whose bibliographic data is presented at the end of the present description) and in ASDs. Neutral-point-clamped (NPC) and Active Neutral-point-clamped (ANPC), cascaded H-bridge (CHB), flying capacitor (FC), as well as modular multilevel (MMC) converters are some major types among various presented MLCs in the literature [1-5]. The five-level ANPC converter, which is formed by combination of one 3L ANPC leg and one FC cell, and its hybrid sub-topologies are widely used in various industrial applications such as medium voltage industrial drives, static ground power units (GPU) for aircraft, and renewable energy conversion systems [6-13].

The ANPC topology and its generalized configuration have been presented and described in [14] and [15]. FIG. 1A, illustrates an example of a 5L-ANPC converter with a hybrid configuration which comprises one 3L ANPC leg and one FC cell working in an inverter mode. Various modulation methods have been presented in the literature for the 5L ANPC converter to provide improved output voltage Total harmonic distortion (THD) as well as the dc capacitors and FC voltage balancing. In [8], a modulation method has been proposed to balance the dc capacitors and FC voltages of the single-phase 5L ANPC converter for PV applications. Even though the proposed method can operate at unbalanced condition, it needs to measure dc capacitors and FC voltages as well as output current. Hence, it requires four sensors to control the 5L ANPC converter. The simple modulator using nearest voltage level technique has been presented in [16] to balance dc capacitors voltages, as well as FC voltage to their desired values. However, it also requires voltage sensors to measure and closed-loop control of the dc capacitors voltages as well as FC voltage. Model predictive pulse pattern control methods (MP3C) have been proposed and applied to ABB ACS2000 general-propose drive in [17] and [18]. An improved finite control set model predictive control (FCS-MPC) method using pseudo functions has been suggested to the 5L ANPC converter in [19]. The dc capacitor and FC voltages are balanced to their desired values and common-mode voltage (CMV) is minimized by employing the suggested improved FCS-MPC. Moreover, by employing the defined pseudo-functions, only measuring the FC and neutral point voltages are required. However, the switching frequency of 5L ANPC is variable by employing aforementioned modulation techniques.

Furthermore, ASDs Systems exploit pulse-width modulation (PWM) methods to provide improved output voltage waveform with THD. However, rated voltage of motor cannot be achieved by applying the sinusoidal PWM (SPWM) method in linear modulation region. Hence, to generate rated voltage at the output of ASD system, the SPWM method should operate in non-linear region also named as over-modulation region which leads to higher THD and distorted output voltage waveform.

Therefore, there exists a need for a switching technique for the converters used in ASD systems which provide improved output voltage THD as well as the dc capacitors and FC voltage balancing while maintaining a constant switching frequency.

Moreover, there exist a need for a switching technique capable of providing non-sinusoidal output voltage.

SUMMARY

Accordingly, the applicant has provided a solution to above-mentioned problems by providing a simplified carrier-based PWM method and apparatus for 5L ANPC converter to obtain constant switching frequency and equal loss distribution among high frequency power switches.

While phase-shifted PWM (PS-PWM) method has been proposed for the 5L ANPC converter in [20]. The neutral-point potential is regulated by calculating the optimum zero-sequence voltage. Moreover, the FC voltage is regulated to its desired value by employing two PWM signals. However, dc capacitors and FC voltages must be measured in the presented method. The modified PS-PWM method has been presented in [21] to FC voltage self-balancing and to improve the output voltage THD for static GPU application. Two-phase shifted PWM signals shifted by p have been used to regulate the FC voltage in the 5L ANPC converter. [22] has proposed a space vector PWM (SVPWM) for the 5L ANPC converter. By applying the presented SVPWM method, higher output voltage is obtained and CMV is eliminated. However, a hexagon diagram including 96 triangles and 125 vector is required for the proposed SVPWM method. [23] has proposed a hybrid modulation method, which consists of 3L-SVPWM modulator and two-phase shifted PWM signals, for the 5L ANPC converter. Hence, the complexity of the SVPWM method is decreased by applying the hybrid modulation method. However, the dc capacitors and FC voltages must be measured in both SVPWM and hybrid modulation method. Furthermore, multiple PWM carrier signals and voltage sensors, as well as complex calculations are required in above-mentioned fixed-frequency modulation methods for the 5L-ANPC converter.

Some advantages of the proposed control technique can be one or more of the following:
  i. The control technique may require only one PWM carrier signal and two logic functions to provide switching signals.
  ii. The flying capacitor (FC) voltage as well as dc-link capacitors voltages can be automatically regulated to their desired values without external control
  iii. Elimination of the odd multiples of the switching harmonic clusters from the output voltage is possible
  iv. The frequency of first switching harmonic cluster can be doubled
  v. Less filtering efforts may be required since the values of the output LC filter inductor and capacitor can be very much reduced
  vi. Notable reduction in control complexity is possible
  vii. Equal power loss distribution between high frequency (HF) power devices is possible.
  viii. Reduced size, and cost of the 5L-AN PC is possible
  ix. Higher power density can be achievable
  x. Less hardware needed for the control is possible
  xi. Sensorless type of control with reduced count of hardware components is possible In one broad aspect, the present disclosure provides a new simplified single carrier PWM method with sensor-less capacitors voltage balancing and improved output voltage THD and equal loss distribution among high frequency power switches. Therefore, all the capacitors' voltage sensors may be eliminated, and only one PWM timer and logic functions may implement the proposed modulation method.

In some embodiment of the present disclosure, a low-cost microcontroller or complex programmable logic device (CPLD) can be used to implement the proposed single-carrier sensor-less modulation method.

In some examples, odd multiples of switching harmonic cluster frequency may be canceled out by utilizing the suggested single-carrier sensor-less modulation method, which causes remarkable reduction in values of the output passive filter components. Accordingly, employing the disclosed switching method in the 5L ANPC converter may lead, among others, to notable decrease in control complexity, size, and cost of the 5L ANPC converter and remarkable increase the 5L ANPC converter power density.

In one broad aspect, the present disclosure provides multi-level power inverter having a DC input and at least one AC phase output comprising for each one of said at least one AC phase output two DC capacitors connected in series with said DC input, said DC capacitors, in operation, being charged to one half of a voltage of said DC input; a ground or neutral terminal connected to a midpoint between said two DC capacitors connected in series; a pair of power switches S3 connected in series across a first one of said two DC capacitors; a pair of power switches S4 connected in series across a second one of said two DC capacitors; a flying capacitor, in operation, being charged to one quarter of a voltage of said DC input; a pair of power switches S2, a first one of said power switches S2 connected between a midpoint between said power switches S3 and a first terminal of said flying capacitor and a second one of said power switches S2 connected between a midpoint between said power switches S4 and a second terminal of said flying capacitor; a pair of power switches S1, a first one of said power switches S1 connected between the first terminal of said flying capacitor and one of said at least one AC phase output, and a second one of said power switches S1 connected between the second terminal of said flying capacitor and said one of said at least one AC phase output; an LC filter connected to the one of said at least one AC phase output; and a modulator having an input for receiving a reference waveform signal and gate signal outputs connected to each of the pairs of power switches S1 through S4, wherein said modulator, in operation, produces said gate signal outputs without sensor feedback, cause the flying capacitor to be equally charged and discharged in each pulse-width modulation period for voltage balancing of the flying capacitor, and causes the switching time of said pairs of power switches S3 and S4 to be equal to balance the voltages on said two DC capacitors while canceling odd multiples of a switching harmonic cluster frequency and doubling the first switching harmonic cluster frequency.

In some examples, the modulator of the multi-level power inverter may comprise at least one zero-crossing detectors, two proposed pseudo logic function circuits; and a single carrier signal source.

In some examples, the modulator of the multi-level power inverter may comprise a processor and memory storing instructions that when executed by the processor generate a sequence of said gate signal outputs in accordance with said reference waveform signal.

In some examples, the modulator of the multi-level power inverter may comprise modulator input comprises waveform characteristic data of said reference waveform signal.

In some examples, the at least one AC phase output of the multi-level power inverter may comprise said three AC phase outputs, said reference waveform signal comprising three reference waveform signals having phases separated by 120 degrees and a common frequency and amplitude.

In some examples, the converter may further have an LC filter connected to the one of said at least one AC phase output.

In one other broad aspect, the present disclosure provides a multi-level power rectifier having a DC output and at least one AC phase input comprising: two DC capacitors connected in series with said DC output, said DC capacitors, in operation, being charged to one half of a voltage of said DC output; for each one of said at least one AC phase input: a ground or neutral terminal connected to a midpoint between said two DC capacitors connected in series; a pair of power switches S3 connected in series across a first one of said two DC capacitors; a pair of power switches S4 connected in series across a second one of said two DC capacitors; a flying capacitor, in operation, being charged to one quarter of a voltage of said DC output; a pair of power switches S2, a first one of said power switches S2 connected between a midpoint between said power switches S3 and a first terminal of said flying capacitor and a second one of said power switches S2 connected between a midpoint between said power switches S4 and a second terminal of said flying capacitor; a pair of power switches S1, a first one of said power switches S1 connected between the first terminal of said flying capacitor and one of said at least one AC phase input, and a second one of said power switches S1 connected between the second terminal of said flying capacitor and said one of said at least one AC phase input; and a current controller receiving phase and current measurements from said at least one AC phase input, a desired DC voltage signal and producing at least one reference waveform signal for each of said at least one AC phase input; a modulator having an input for receiving said at least one reference waveform signal for each of said at least one AC phase input and having gate signal outputs connected to each of the pairs of power switches S1 through S4, wherein said modulator, in operation, produces said gate signal outputs without sensor feedback, cause the flying capacitor to be equally charged and discharged in each pulse-width modulation period for voltage balancing of the flying capacitor, and causes the switching time of said pairs of power switches S3 and S4 to be equal to balance the voltages on said two DC capacitors while canceling odd multiples of a switching harmonic cluster frequency and doubling the switching harmonic cluster frequency.

In some examples, the modulator of the multi-level power rectifier may include at least one zero-crossing detector; two logic function circuits; and a single carrier signal source.

In some examples, the modulator of the multi-level power rectifier may include a processor and memory storing instructions that when executed by the processor generate a sequence of said gate signal outputs in accordance with said at least one reference waveform signal.

In some examples, the modulator of the multi-level power rectifier may include modulator input comprises waveform characteristic data of at least one said reference waveform signal.

In some examples, the at least one AC phase input of the multi-level power rectifier may include three AC phase inputs, said reference waveform signal comprising three reference waveform signals having phases separated by 120 degrees and a common frequency and amplitude.

In some examples, the multi-level power rectifier may include grid filter connected to the one of said at least one AC phase input. In one embodiment, the grid filter comprises an inductance and a resistance for each one of said at least one AC phase input.

In one other broad aspect, the present disclosure provides a motor controller comprising a rectifier for converting AC power to DC power; the multi-level power inverter as disclosed herein connected to said rectifier; and a controller connected to a motor sensor and to the input of said modulator input for providing said a reference waveform signal.

In one other broad aspect, the present disclosure provides a motor controller comprising the multi-level rectifier as disclosed herein for converting AC power to DC power, a power inverter connected to said rectifier and having a pulse width modulator; and a controller connected to a motor sensor and to the input of said modulator input for providing a reference waveform signal.

In one other broad aspect, the present disclosure provides a motor controller comprising the multi-level rectifier as disclosed herein for converting AC power to DC power, a multi-level power inverter as defined in any one of claims 1 to 6 connected to said rectifier; and a controller connected to a motor sensor and to the input of said modulator input for providing said a reference waveform signal.

BRIEF DESCRIPTION OF THE DRAWINGS

The invention will be better understood by way of the following detailed description of embodiments of the invention with reference to the appended drawings, in which.

DETAILED DESCRIPTION

This patent application provides complementary improvements that may be applied separately or in combination.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. Reference will now be made in detail to the preferred embodiments of the invention.

Figure 1A:
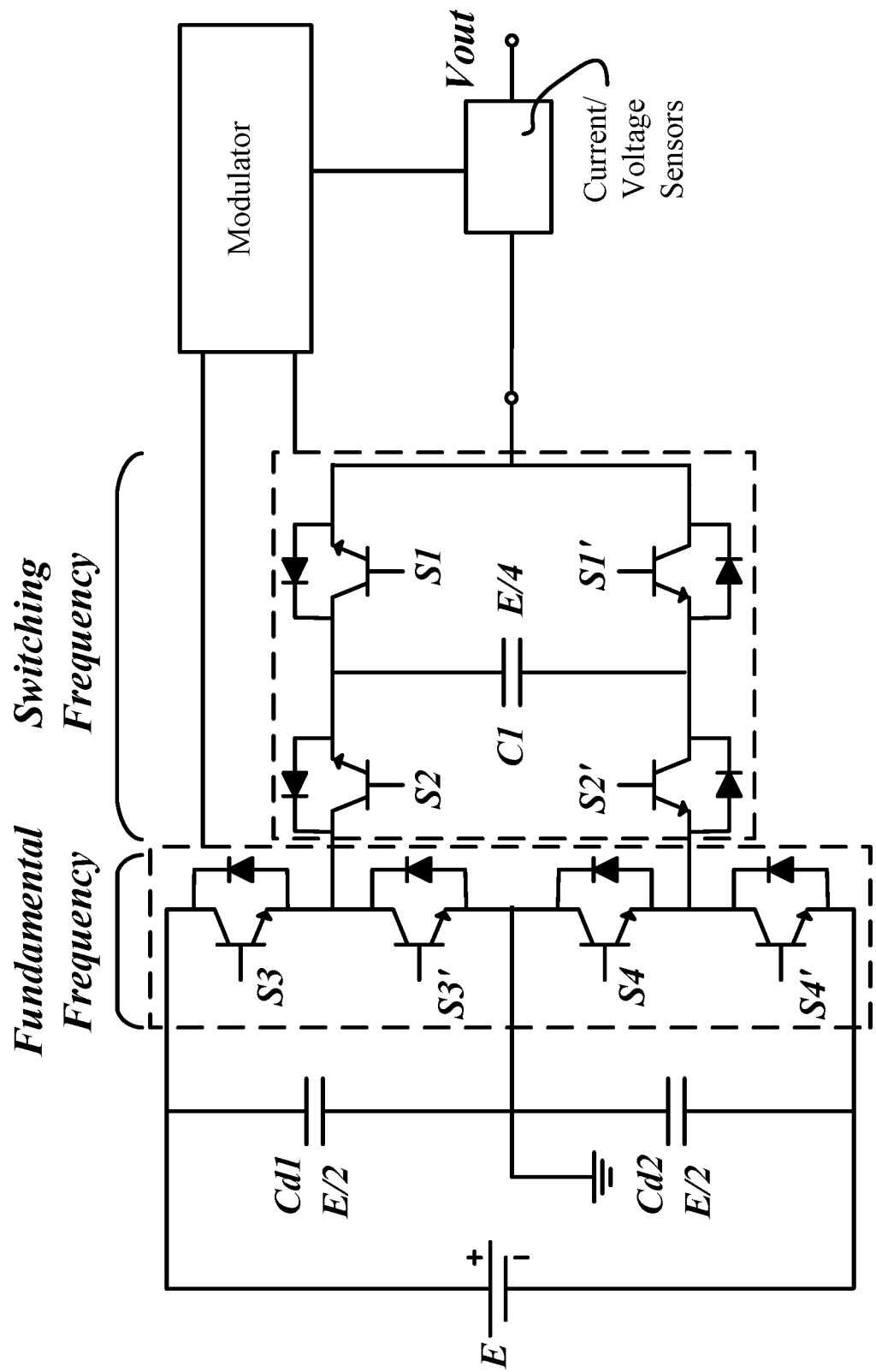
FIG. 1A is an exemplary illustration of topology of a prior art 5L-ANPC converter.

Multilevel Inverters (MLI) are becoming more and more common thanks to the advantages they provide such as amended output voltage harmonic content, reduced dv/dt, lower switching frequency and losses, higher efficiency, decreased electromagnetic interference (EMI) and Fault-tolerant capability. There are three major topologies of MLIs which are Neutral-Point-Clamped (NPC) Converter, Cascaded H-bridge (CHB) Converter, Flying Capacitor Multicell (FCM) Converter & Stacked Multicell (SM) Converter. One of competitive MLI configurations is Active-Neutral-Point-Clamped (ANPC) Converter. 5L-ANPC Converter is a hybrid configuration of NPC and FC converters. The 5L ANPC may comprise 4 low-frequency and 4 high-frequency switches, one flying capacitor and one dc power supply. An illustration of a 5L ANPC is shown in FIG. 1A. As illustrated the controller typically uses feedback from one or more sensors to adjust and control the switches.

Figure 1B:
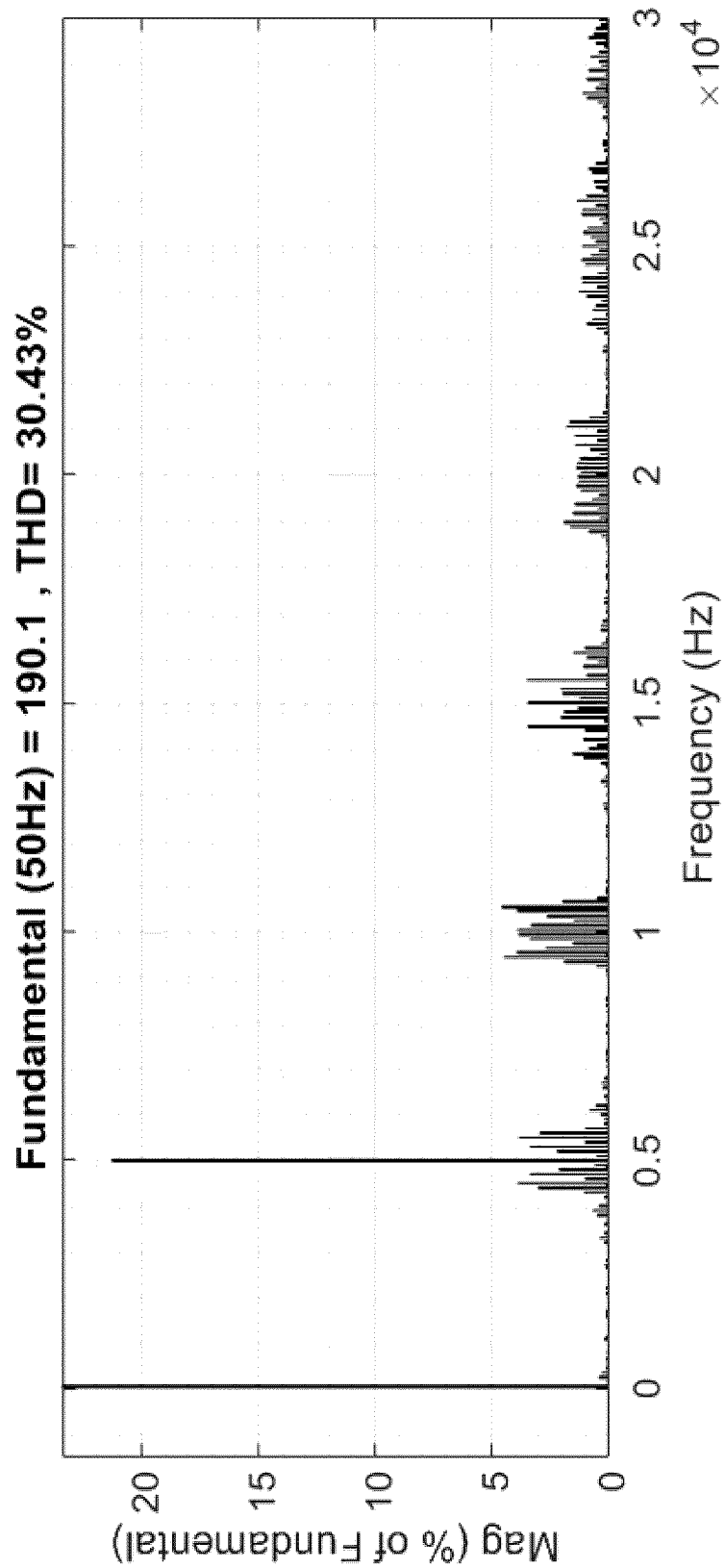
FIG. 1B illustrates the FFT analysis of the output voltage of the 5L ANPC using the traditional PWM techniques in the art.

FIG. 1B illustrates the FFT analysis of the output voltage of the 5LANPC using the traditional PWM techniques in the art. As can be compared with the FFT analysis of the proposed single-carrier sensorless PWM method shown in FIG. 5. As illustrated, the analysis shows high harmonics in case of applying the traditional methods whereas by applying the proposed single carrier sensor-less PWM method the odd multiples of the switching harmonic clusters are canceled out, namely the presence of signal at 5 kHz, 15 kHz and 25 kHz present in FIG. 1B is largely eliminated in FIG. 5.

As shown in FIG. 1A, the 5L-ANPC converter is a hybrid configuration which comprises one 3L ANPC leg and one FC cell. It consists of one dc power supply, two dc capacitors, one FC, four low-frequency and four high-frequency power switches. If the dc power supply voltage is E, the dc capacitors and FC voltages are regulated to E/2 and E/4, respectively.

Table 1 illustrates the output voltage levels, as well as dc link and FC capacitors charging/discharging states for all switching states. In Table I, $\Delta E_{Cdc}$ and $\Delta E_{Cfc}$ represent charging/discharging states of the dc capacitors and FC. The power switch Sx is ON when it is 1 and is OFF when it is 0.

As presented in Table I, The FC is regulated to E/4 by using the redundant switching states in the 5L ANPC converter. Moreover, the dc capacitors voltages are balanced to E/2 if the duration of S3 and S4 are equal (S3=S4).

Figure 2A:
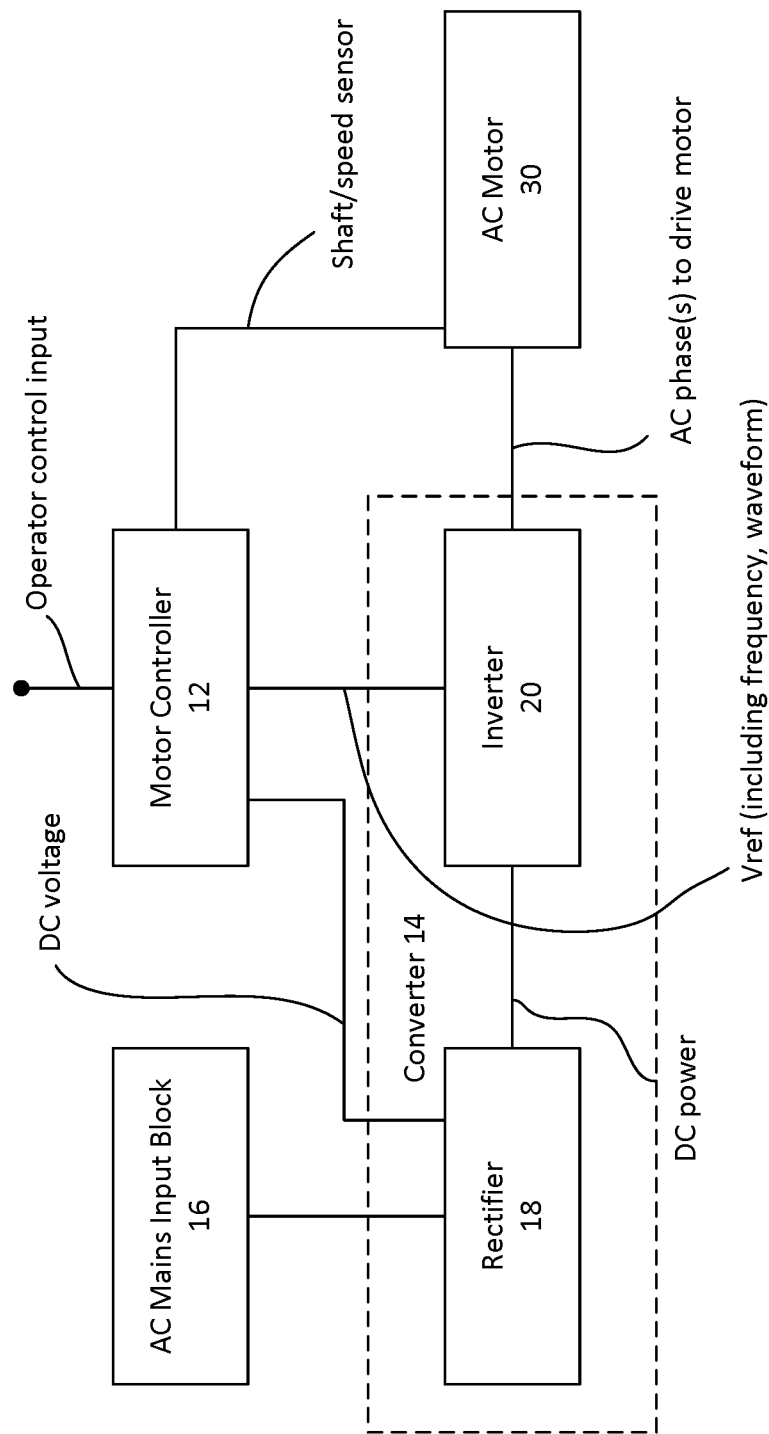
FIG. 2A is a block diagram showing a motor controller according to an embodiment of the proposed solution.

FIG. 2A is a block diagram of an embodiment of the present disclosure having a controller 12 and a converter 14 receiving AC current from an AC mains input 16 at a rectifier 18. The rectifier 18 converts the current to DC and sends the DC current to inverter 20 which converts it back to AC in one or more phases before sending it to AC motor 20. This process of conversion to DC and back to AC may provide, among others, the possibility of adjusting the frequency of the current. As illustrated, in some examples, the controller 12 may receive input from a user, an automation control system or other higher level of control as well as input from a motor shaft encoder (or other speed sensor) to determine $V_{ref}$ and provides the PWM accordingly to the rectifier and inverter.

Figure 2B:
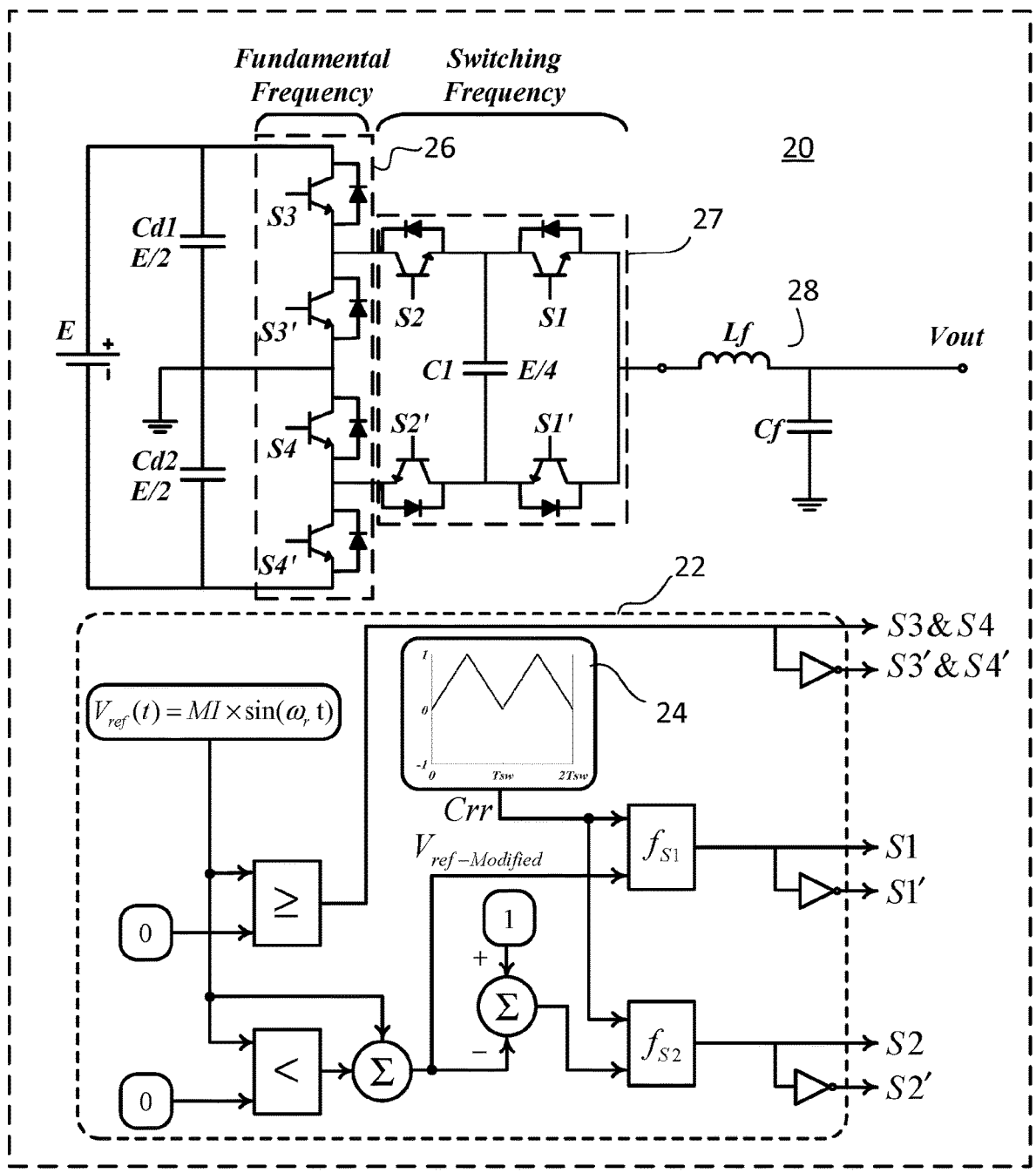
FIG. 2B is a schematic illustration of the proposed single-carrier sensor-less PWM method for the 5L ANPC converter in accordance with one embodiment of the present disclosure.
Figure 2C:
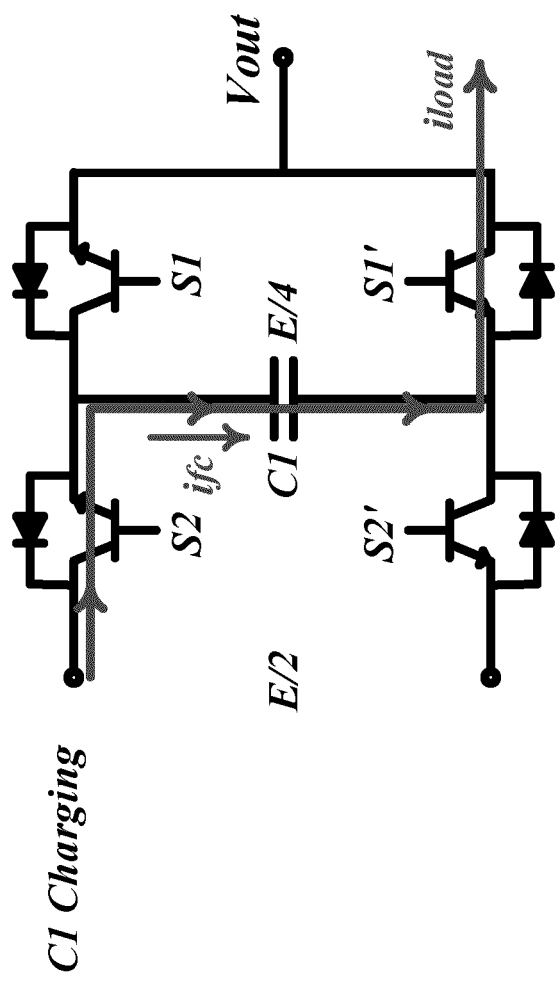
FIG. 2C is a schematic illustration of the current flow inside the circuit when C1 is charging in accordance with one embodiment of the present disclosure.
Figure 2D:
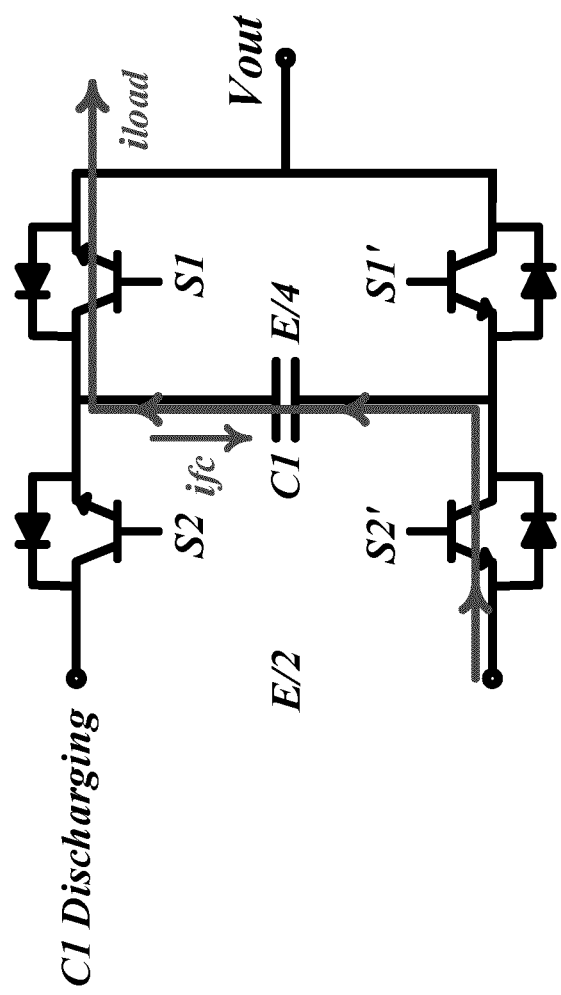
FIG. 2D is a schematic illustration of the current flow inside the circuit when C1 is discharging in accordance with one embodiment of the present disclosure.

FIGS. 2C and 2D show the current flow inside the circuit when C1 is respectively charging and discharging in accordance with one embodiment of the present disclosure.

TABLE 1

Switching states of the 5L-ANPC converter.

| Switching State | S4 | S3 | S2 | S1 | $V_{out}$ | $\Delta E_{Cfc}$ | $\Delta E_{Cdc}$ |
|---|---|---|---|---|---|---|---|
| $V_1$ | 0 | 0 | 0 | 0 | $-\frac{E}{2}$ | No effect | Discharge |
| $V_2$ | 0 | 0 | 0 | 1 | $-\frac{E}{4}$ | Discharge | Discharge |
| $V_3$ | 0 | 0 | 1 | 0 | $-\frac{E}{4}$ | Charge | Discharge |
| $V_4$ | 0 | 0 | 1 | 1 | 0 | No effect | No effect |
| $V_5$ | 1 | 1 | 0 | 0 | 0 | No effect | No effect |
| $V_6$ | 1 | 1 | 0 | 1 | $+\frac{E}{4}$ | Discharge | Charge |
| $V_7$ | 1 | 1 | 1 | 0 | $+\frac{E}{4}$ | Charge | Charge |
| $V_8$ | 1 | 1 | 1 | 1 | $+\frac{E}{2}$ | No effect | Charge |

The Proposed Single-Carrier Sensor-Less PWM Method for the 5L ANPC Converter

FIG. 2B is a schematic illustration of an example of a single-carrier sensor-less PWM inverter 20 controlling a 5L ANPC converter in accordance with one embodiment of the present disclosure. As shown in FIG. 2B, the suggested single-carrier sensor-less modulator 22 may only require one PWM carrier signal 24. Also, only one zero-crossing detector and two defined pseudo logic functions may be needed to provide switching signals of power switches. Therefore, in some embodiments, a low-cost microcontroller or logic circuits may be used to implement the proposed switching method. Moreover, by employing the proposed sensor-less switching method, the flying capacitor (FC) C1 is equally charged and discharged in each PWM period which causes sensor-less voltage balancing of FC in the 5L ANPC converter. In addition, since S3 and S4 may be equal and generated by zero-crossing comparator, the voltages of dc link capacitors Cd1 and Cd2 are also balanced to desired values. Furthermore, the odd multiples of switching harmonic cluster frequency may be canceled out, and then the frequency of first switching harmonic cluster is doubled by applying the proposed modulation method. Hence, in some examples, the values of the output LC filter inductor and capacitor may be reduced to half.

Figure 3:
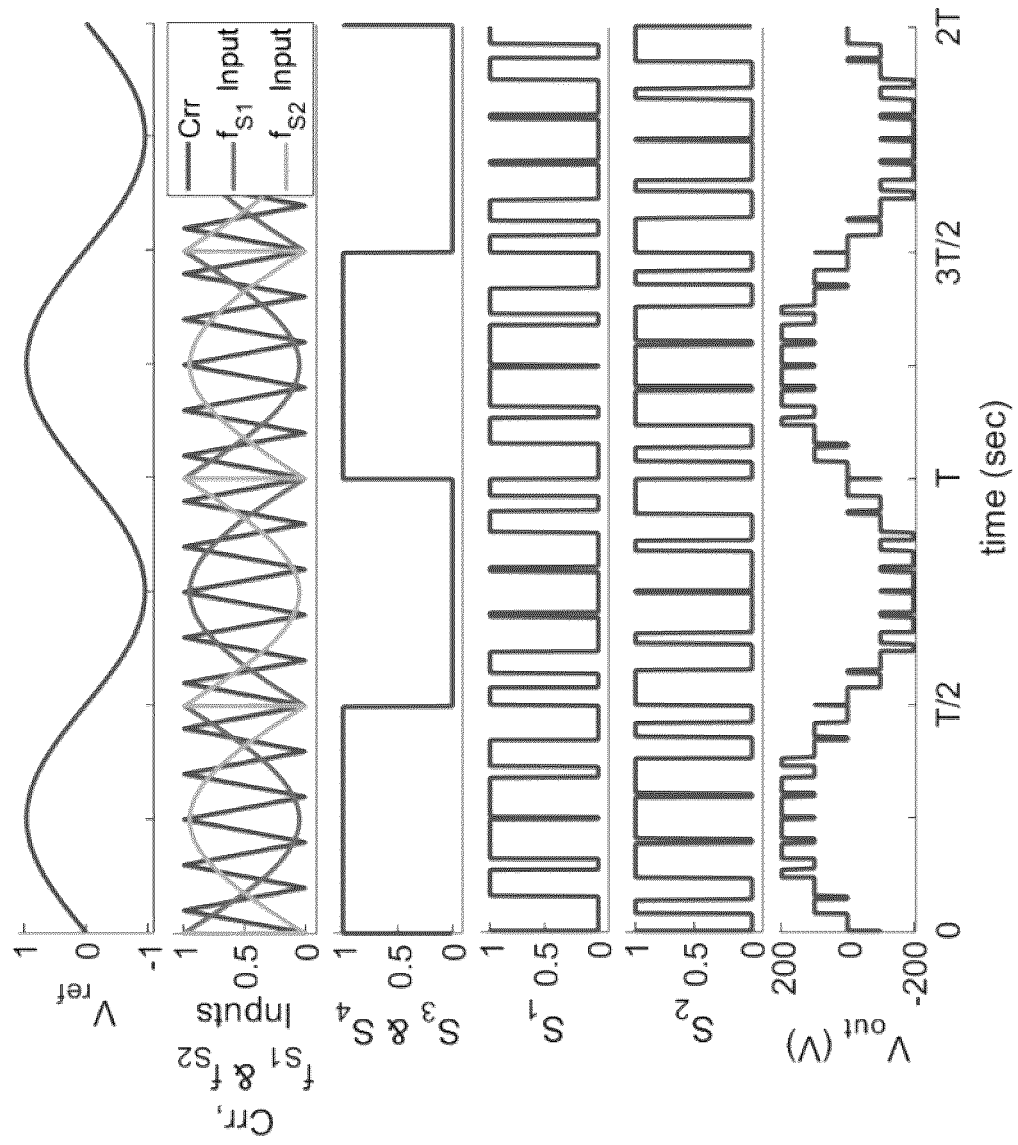
FIG. 3. Illustrates an example of the switching pattern of the proposed modulation method, showing the input reference voltage Vref, $f_{S1}$ and $f_{S2}$ inputs, carrier signal Crr, switching signals S1 through S4, and output voltage $V_{out}$ in accordance with one example of the present disclosure.

While the modulator 22 in FIG. 2B produces the gates signals for switches S1 to S4 and S1' to S4' using circuitry and a single carrier signal source, it will be appreciated that the switch signals follow a fixed sequence for a given Vref, as is illustrated in FIG. 3. Accordingly, the modulator may comprise a processor and memory storing instructions that when executed by the processor generate a sequence of the gate signal outputs in accordance with the reference waveform signal.

Figure 2E:
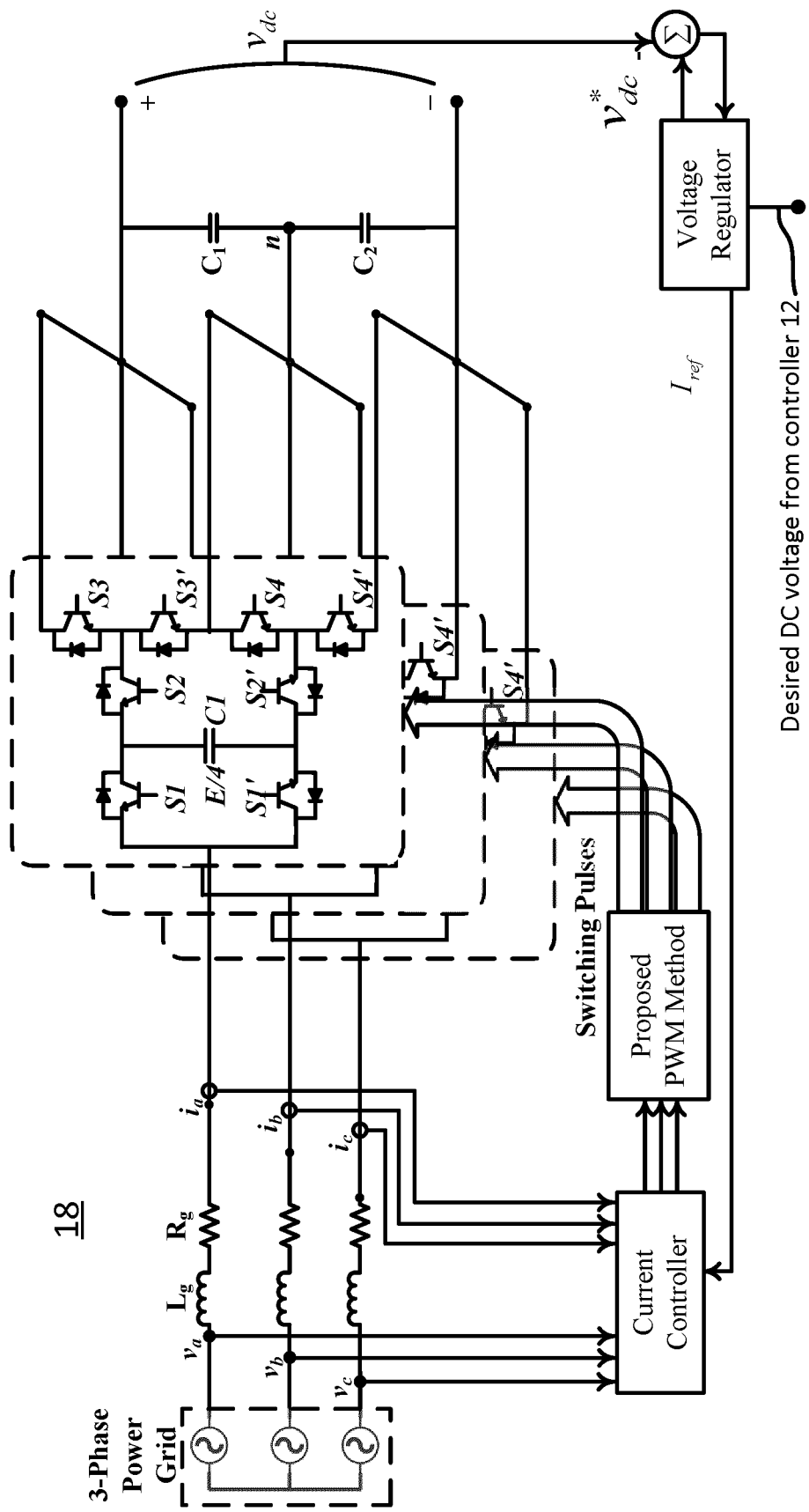
FIG. 2E is an exemplary illustration of topology of a three-phase 5L-ANPC converter working in rectifier mode.

Rectifier 18 is shown in FIG. 2E. The rectifier can also use a five-level ANPC architecture if desired, as is known in the art. However, the embodiment in FIG. 2E uses the single carrier modulation as described herein.

To achieve high precision output DC voltage, continuous sinusoidal input current with low THD, unity power factor (PF) as well as fast transient response, active front end (AFE) rectifiers are widely used in various industrial applications. Because of high-power and medium voltage operation capability, reduced EMI, improved THD, lower, reduced switching frequency and losses, improved power grid side quality as well as higher efficiency, multilevel converters (MLC) can be considered as among the most promising solutions for AFE rectifiers. By applying the 5L-ANPC converter to the AFE rectifier, the AFE rectifier input filter size is notably decreased which results in higher power density AFE rectifier. The AFE rectifier based on the 5L-ANPC converter is shown in FIG. 2E. The three phase supply voltages connected to the 5L-ANPC converter using the input inductors with internal resistance. It will be appreciated that if the available power source is single phase, the rectifier can be arranged as a single-phase rectifier even if the desired motor supply is then three-phase.

The discrete-time state space model of the proposed AFE is expressed as $$x(k+1) = A \times x(k) + B(k) \times S_{AFE}(k) + C \times u(k)$$

where $$x(k) = \begin{bmatrix} i_s(k) \\ V_{dc}(k) \end{bmatrix}, u(k) = \begin{bmatrix} v_s(k) \\ I_{dc}(k) \end{bmatrix}$$

$$v_s = \frac{2}{3}(v_a + av_b + a^2 v_c)$$

$$i_s = \frac{2}{3}(i_a + ai_b + a^2 i_c)$$

$$a = e^{j2\pi/3}$$

$$A = \begin{bmatrix} 1 - \frac{R_g \times T_s}{L_g} & 0 \\ 0 & 1 \end{bmatrix}, B(k) = \begin{bmatrix} \frac{-V_{dc}(k) \times T_s}{L_g} \\ \frac{i_s(k) \times T_s}{C_{dc}} \end{bmatrix}$$

$$C = \begin{bmatrix} \frac{T_s}{L_g} & 0 \\ 0 & -\frac{T_s}{C_{dc}} \end{bmatrix}$$

Moreover, $V_{dc}$, and $I_{dc}$ are the AFE rectifier output dc voltage and load dc current, respectively. $C_{dc}$ is the AFE rectifier output dc capacitor, and $T_s$ is sampling time. In addition, $S_{AFE}(k)$ is the switching function of the 5L-ANPC converter and is defined as follows $$S_{AFE} = \frac{2}{3}(S_a + aS_b + a^2 S_c)$$

where $S_a$, $S_b$, and $S_c$, are the switching states of the 5L-ANPC converter each leg and are illustrated in the following table:

| SWITCHING STATES OF THE 5L-ANPC CONVERTER. | | | | | | |
|---|---|---|---|---|---|---|
| S4 | S3 | S2 | S1 | $S_x$ | $\Delta E_{Cfc}$ | $\Delta E_{Cdc}$ |
| 0 | 0 | 0 | 0 | −1 | No effect | Discharge |
| 0 | 0 | 0 | 1 | −½ | Charge | Discharge |
| 0 | 0 | 1 | 0 | −½ | Discharge | Discharge |
| 0 | 0 | 1 | 1 | 0 | No effect | No effect |
| 1 | 1 | 0 | 0 | 0 | No effect | No effect |
| 1 | 1 | 0 | 1 | +½ | Discharge | Charge |
| 1 | 1 | 1 | 0 | +½ | Charge | Charge |
| 1 | 1 | 1 | 1 | +1 | No effect | Charge | where x=a, b, c. In Table I, the switch S1,S2,S3, and S4 is ON when it is 1 and is OFF when it is 0.

Considering the above equations, the AFE rectifier has non-linear time variable state space model. Hence, the cascaded controllers including outer dc-link voltage and inner power control loops are employed to control the AFE rectifier. Generally, two cascaded PI controllers is used for outer-loop dc-link voltage control and inner-loop current loops control. Because of cascaded structure of the controller, the inner-loop current controller should be much faster than outer-loop dc-link voltage controller. Normally, the inner-loop current controller is designed at least five times faster than the outer-loop dc-link voltage controller. In addition, the switching frequency should also be selected high enough in comparison to the inner-loop current controller. Generally, the switching frequency is considered as at least eight times faster than inner-loop current loop bandwidth.

By applying the proposed single carrier sensorless modulation method to the three-phase 5L ANPC active-front-end (AFE) rectifier shown in FIG. 2E, not only the sensorless voltage balancing of all the capacitors are achieved, but also because of eliminating the odd multiples of the switching harmonic clusters from the AFE input voltage, the value of input grid link inductor ($L_g$) is halved. So, the smaller input inductor and higher power density AFE rectifier is obtained.

Figure 2F:
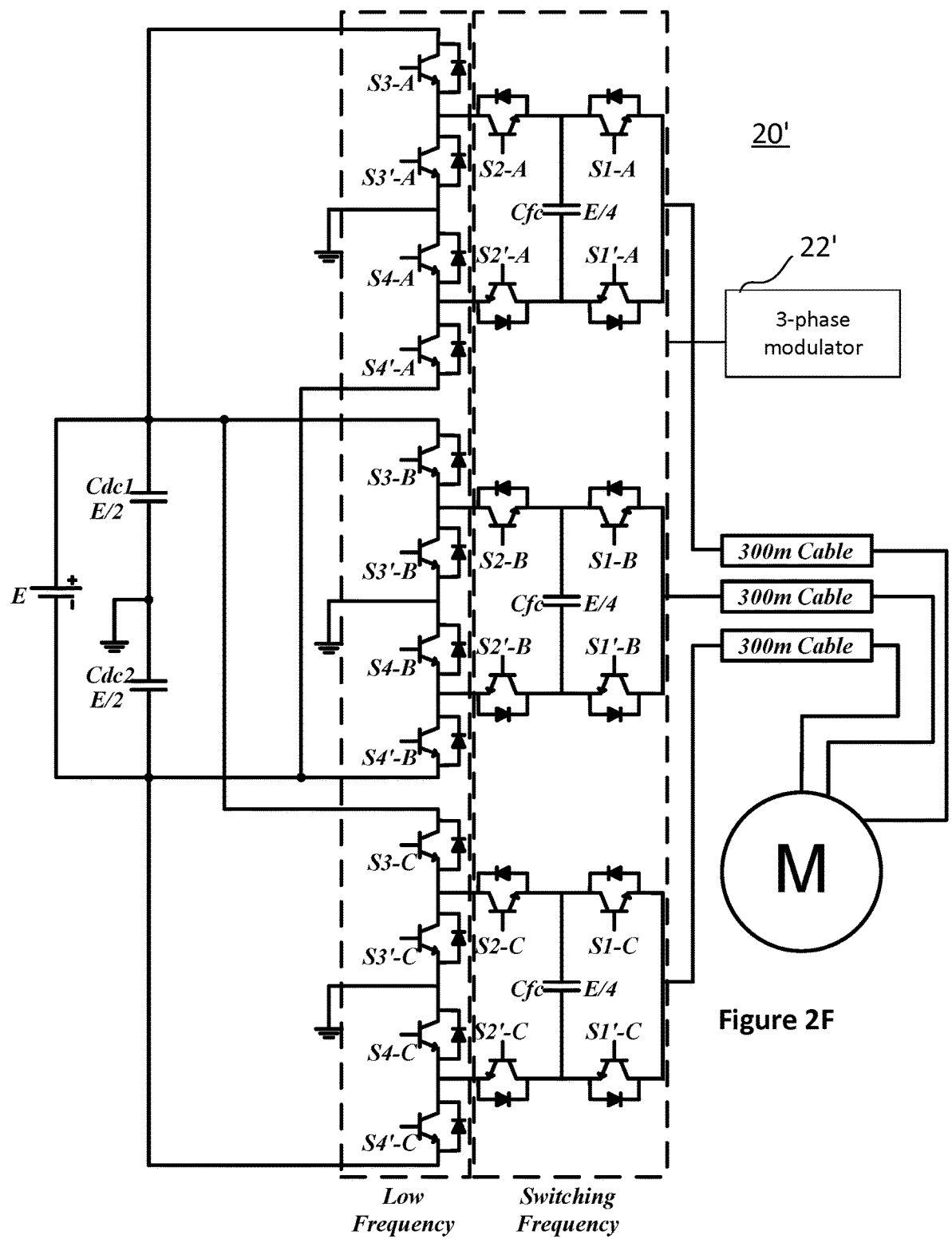
FIG. 2F is a schematic illustration of the three-phase 5L ANPC ASD system for motor drive application in accordance with one embodiment of the present disclosure.

Many AC electric motors are three-phase motors. FIG. 2F illustrates the three-phase version of inverter 20'.

In some examples of the proposed modulation method, S3 and S4 switching signals may be generated by employing the zero-crossing comparator (ZC). Therefore, (S3, S3') and (S4, S4') shown as part of module 30 commutate at fundamental frequency. Thus, Zc, (S3, S3'), and (S4, S4') are defined as:

$$Z_C = \begin{cases} 1, & V_{ref} \geq 0 \\ 0, & V_{ref} < 0 \end{cases} \quad (1)$$

$$S_3 = S_4 = Z_C \quad (2)$$

The modified reference voltage ($V_{ref\,Modified}$) is defined to provide (S1, S1') and (S2, S2'), shown as a part of module 40, by using only one PWM carrier signal. Hence, V ref Modified is defined as $$V_{ref-Modified} = \begin{cases} V_{ref}, & V_{ref} \geq 0 \\ 1 + V_{ref}, & V_{ref} < 0 \end{cases} \quad (3)$$

$V_{ref\,Modified}$, PWM carrier signal (Crr), as well as $f_{S1}$ and $f_{S2}$ logic functions are used to provide (S1, S1') and (S2, S2') switching signals. $f_{S1}$ and $f_{S2}$ logic functions are defined as $$f_{S1} = \begin{cases} 1, & V_{ref-Modified} \geq Crr \\ 0, & V_{ref-Modified} < Crr \end{cases} \quad (4)$$

$$f_{S2} = \begin{cases} 1, & 1 - V_{ref-Modified} \leq Crr \\ 0, & 1 - V_{ref-Modified} > Crr \end{cases} \quad (5)$$

$$S_1 = f_{S1} \quad (6)$$

$$S_2 = f_{S2} \quad (7)$$

The switching pattern of the proposed single-carrier sensorless modulation method, $f_{S1}$ and $f_{S2}$ inputs, carrier signal, switching signals, and output voltage is depicted in FIG. 3.

As shown in FIG. 3, (S3, S3'), and (S4, S4') commutate at fundamental frequency. Moreover, $f_{S1}$ and $f_{S2}$ logic functions inputs are V ref Modified and (1-V ref Modified), respectively. Therefore, $f_{S1}$ and $f_{S2}$ inputs are compared to Crr carrier signal to generate (S1, S1') and (S2, S2') switching signals, respectively.

In some examples, the charging and discharging of FC may be balanced in each PWM period, and sensor-less voltage balancing of FC may be achieved by utilizing the proposed switching method. Furthermore, the frequency of first switching harmonic cluster may be doubled which may result in reducing the values of the output LC filter inductor and capacitor to half.

FIG. 3. The switching pattern of the proposed modulation method, $f_{S1}$ and $f_{S2}$ inputs, carrier signal, switching signals, and output voltage.

Output Passive LC Filter Design by Employing the Proposed Single-Carrier Sensor-Less Switching Method The inductor value is determined based on desired output current ripple and the capacitor value is calculated based on the cutoff frequency to design the output LC filter. Generally, the maximum allowable output current ripple is defined as 15% of the peak value of nominal current. Therefore, the output current ripple is expressed as $$\Delta I_L = 0.15 \times \sqrt{2} \times \frac{S_{Out}}{V_{Out}} \quad (8)$$

where $\Delta I_L$, $S_{Out}$, and $V_{Out}$ are the output current ripple, the maximum output apparent power and the output voltage of the inverter, respectively. The current ripple in inductor is $$\Delta i = \frac{V_{PWM}}{L} \times \Delta t \quad (9)$$

where $\Delta i$ is the current ripple in inductor, L is the output inductor, $V_{PWM}$ is the pulse voltage across the inductor, and $\Delta t$ is switching time. $\Delta t$ and $V_{PWM}$ are expressed as $$\Delta t = \frac{d}{2 \times f_{1st\ SW\ Harmonic}} \quad (10)$$

$$V_{PWM} = \frac{V_{DC} - V_{Out}}{n - 1} \quad (11)$$

where d is PWM duty cycle, f 1st SW Harmonic is the first switching harmonic cluster frequency, DC V is the dc-link voltage, and n is the number of output voltage levels. By substituting the (10) and (11) in (9), and considering d=(VOut/V DC), the $\Delta i$ is obtained as $$\Delta i = \frac{\left(\frac{V_{DC} - V_{Out}}{n-1}\right)}{L} \times \frac{V_{Out}}{V_{DC}} \times \frac{1}{2 \times f_{1st\ SW\ Harmonic}} \quad (12)$$

The corresponding output voltage at maximum inductor current is calculated as $$\frac{\partial(\Delta i)}{\partial(V_{Out})} = 0 \quad (13)$$

-continued $$\Rightarrow \frac{\partial \left( \frac{\left(\frac{V_{DC} - V_{Out}}{n-1}\right)}{L} \times \frac{V_{Out}}{V_{DC}} \times \frac{1}{2 \times f_{1st\ SW\ Harmonic}} \right)}{\partial(V_{Out})} = 0$$

$$\Rightarrow V_{Out} = \frac{V_{DC}}{2}$$

By substituting (13) in (12), max ($\Delta i$) is expressed as $$(\Delta i)_{max} = \frac{V_{DC}}{8 \times (n-1) \times L \times f_{1st\ SW\ Harmonic}} \quad (14)$$

Then the output filter inductor is obtained as $$L = \frac{V_{DC}}{8 \times (n-1) \times \Delta I_L \times f_{1st\ SW\ Harmonic}} \quad (15)$$

The capacitor value of the output LC filter is calculated based on the cutoff frequency ($f_{cutoff}$). $f_{cutoff}$ is expressed as $$f_{cutoff} = \frac{1}{2\pi \times \sqrt{LC}} \quad (16)$$

The cutoff frequency should be much less than first switching harmonic cluster frequency whereas it should be far enough from the fundamental frequency.

Hence, considering $$f_{cutoff} = \frac{f_{1st\ SW\ Harmonic}}{10}$$

the output LC filter capacitor value is calculated as:

$$C = \frac{1}{\left(2\pi \times \frac{f_{1st\ SW\ Harmonic}}{10}\right)^2 \times L} \quad (17)$$

Therefore, (15) and (17) determine values of the output LC filter inductor and capacitor. With respect to the fact that employing the proposed switching method results in doubling the frequency of first switching harmonic cluster ($f_{1st\ SW\ Harmonic} = 2 \ast f_{SW}$), values of the output LC filter inductor and capacitor are halved and size of the output LC filter size is significantly reduced.

As a case study, the parameters of the studied 5L ANPC converter using the proposed modulation method are as follows $$\begin{cases} n = 5 \\ f_{SW} = 5 \text{ kHz} \\ f_{1st\ SW\ Harmonic} = 2 \times f_{SW} = 10 \text{ kHz} \\ V_{DC} = 400 \text{ V} \\ S_{Out} = 4 \text{ kVA} \\ V_{Out} = 115 \text{ V} \\ I_{NOM} = 34.78 \text{ A} \\ \Delta I_L = 0.15 \times \sqrt{2} \times \frac{4000}{115} = 7.38 \text{ A} \end{cases} \quad (18)$$

where NOM I is nominal current of the studied 5L ANPC converter. Hence, by applying the suggested single-carrier sensor-less modulation method, values of the output LC filter inductor and capacitor are calculated by (15) and (17) as follows $$L_{Prop-PWM}=169.4 \: \mu H \quad (19)$$

$$C_{Prop-PWM}=15 \: \mu F \quad (20)$$

On the other hand, by employing traditional modulation method in the 5L ANPC converter, for the desired specifications in (18) $f_{1 \: st \: SW \: Harmonic}=f_{SW}=5$ kHz and the output LC filter inductor and capacitor values are expressed as $$L_{Trad-PWM}=338.8 \: \mu H \quad (21)$$

$$C_{Trad-PWM}=29.9 \: \mu F \quad (22)$$

Simulation and Experimental Results

Simulation results using MATLAB/Simulink platform are presented to validate the performance and viability of the proposed single-carrier sensor-less switching method for 5L ANPC converter. The parameters of the simulated 5L ANPC converter are presented in Table II.

TABLE II

MAIN PARAMETERS OF THE STUDIED 5L ANPC CONVERTER.

| Parameters | Value |
| --- | --- |
| Fundamental frequency | f = 50 Hz |
| DC-link voltage | E = 400 V |
| Switching frequency | $f_{SW}$ = 5 kHz |
| DC-link capacitors | $C_{dc \: 1} = C_{dc \: 2} = 1200 \: \mu F$ |
| FC | $C_1 = 560 \: \mu F$ |
| Output LC filter | L = 169.4 μH, C = 15 μF |
| Load | R = 15 Ω, L = 5 mH |

Figure 4:
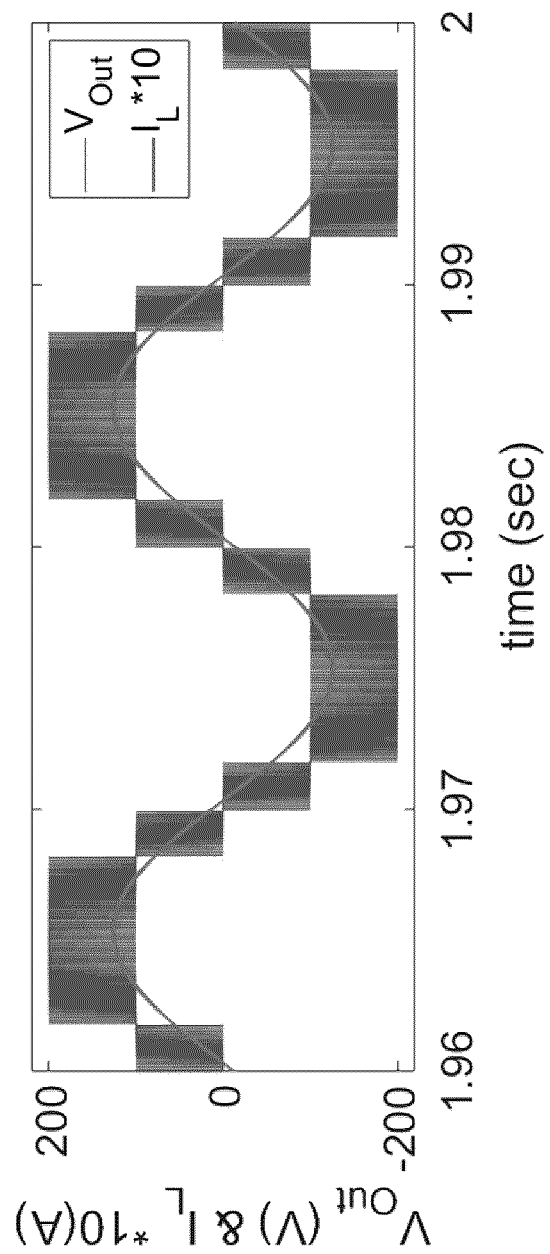
FIG. 4. Illustrates an example of the output voltage of the 5L ANPC converter using the proposed single-carrier sensor-less modulation method and load current multiplied by 10.
Figure 5:
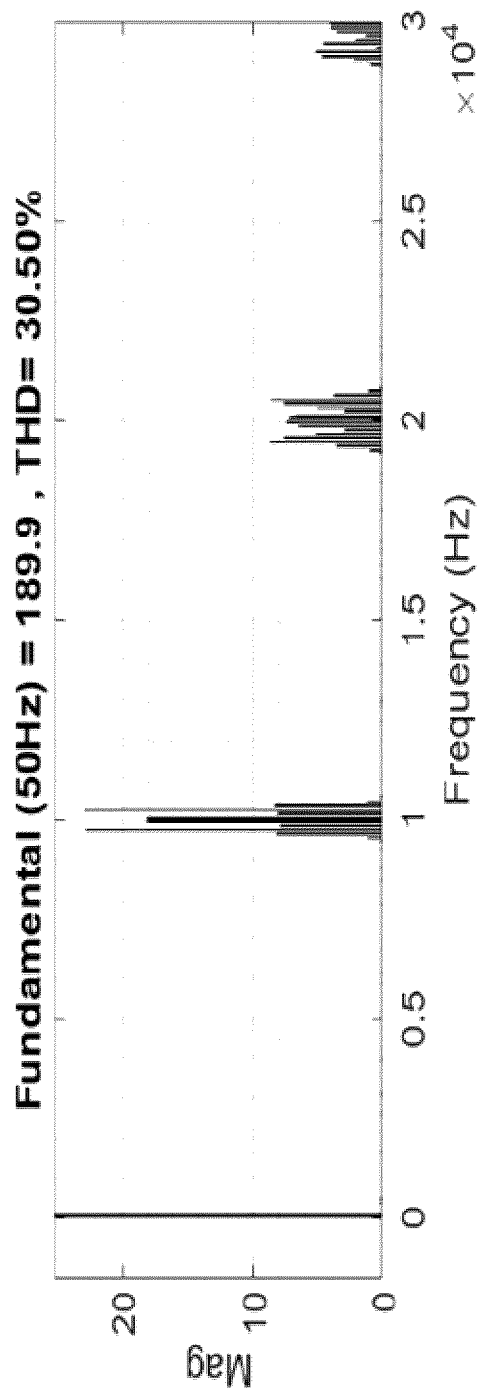
FIG. 5. Illustrates an example of the FFT analysis of the 5L ANPC converter output voltage in accordance with one example of the present disclosure.
Figure 6:
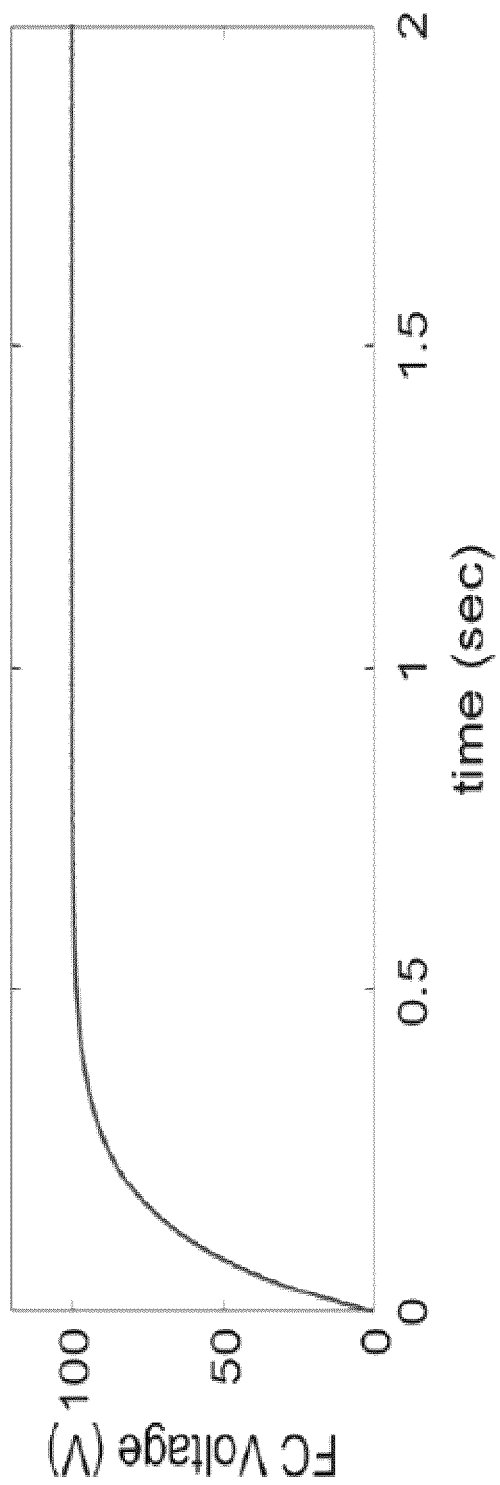
FIG. 6. Illustrates an example of the flying capacitor (FC) transient and steady state voltage during converter start-up in accordance with one example of the present disclosure.
Figure 7:
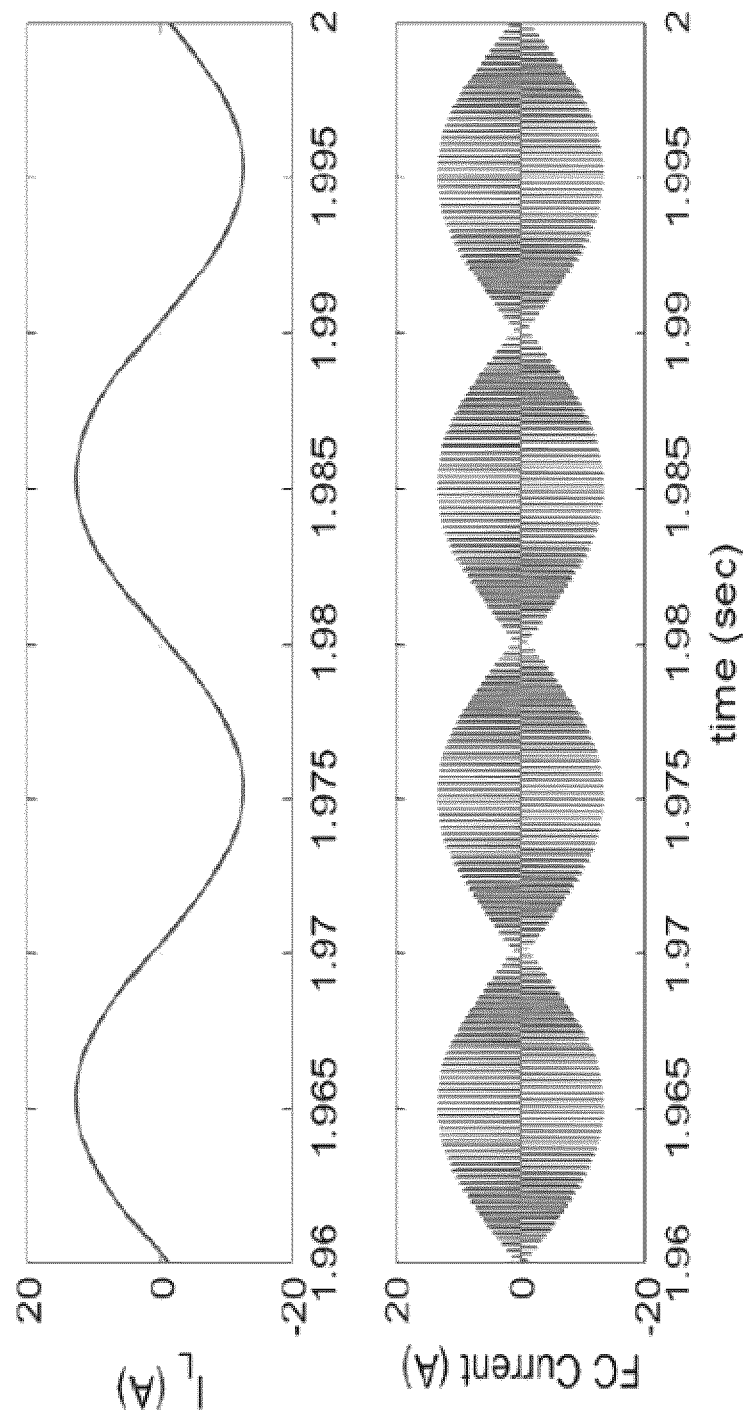
FIG. 7. Illustrates an example of the FC charging/discharging current and load current in accordance with one example of the present disclosure.

The 5L ANPC converter output voltage controlled by the proposed single-carrier sensor-less modulation method as well as load current at R=15Ω, L=5 mH RL load are depicted in FIG. 4. The FFT analysis of the output voltage is shown in FIG. 5. As presented in FIG. 5, the THD of output voltage is 30.50% and the first switching harmonic cluster is shifted to $f_{1stSW \: Harmonic}=2 \times f_{SW}=10$ kHz by employing the suggested modulation method. Moreover, the switching harmonic clusters of output voltage are located at $2 \times k \times f_{SW}$ where k is integer number. Transient and steady state performances of FC voltage during the 5L ANPC converter startup is presented in FIG. 6. As shown in FIG. 6, the voltage of FC is automatically regulated to its desired value by employing the proposed single-carrier sensor-less modulation method. FIG. 7 presents the FC charging/discharging current as well as load current in which the FC charging and discharging periods are balanced in each PWM period.

Figure 8:
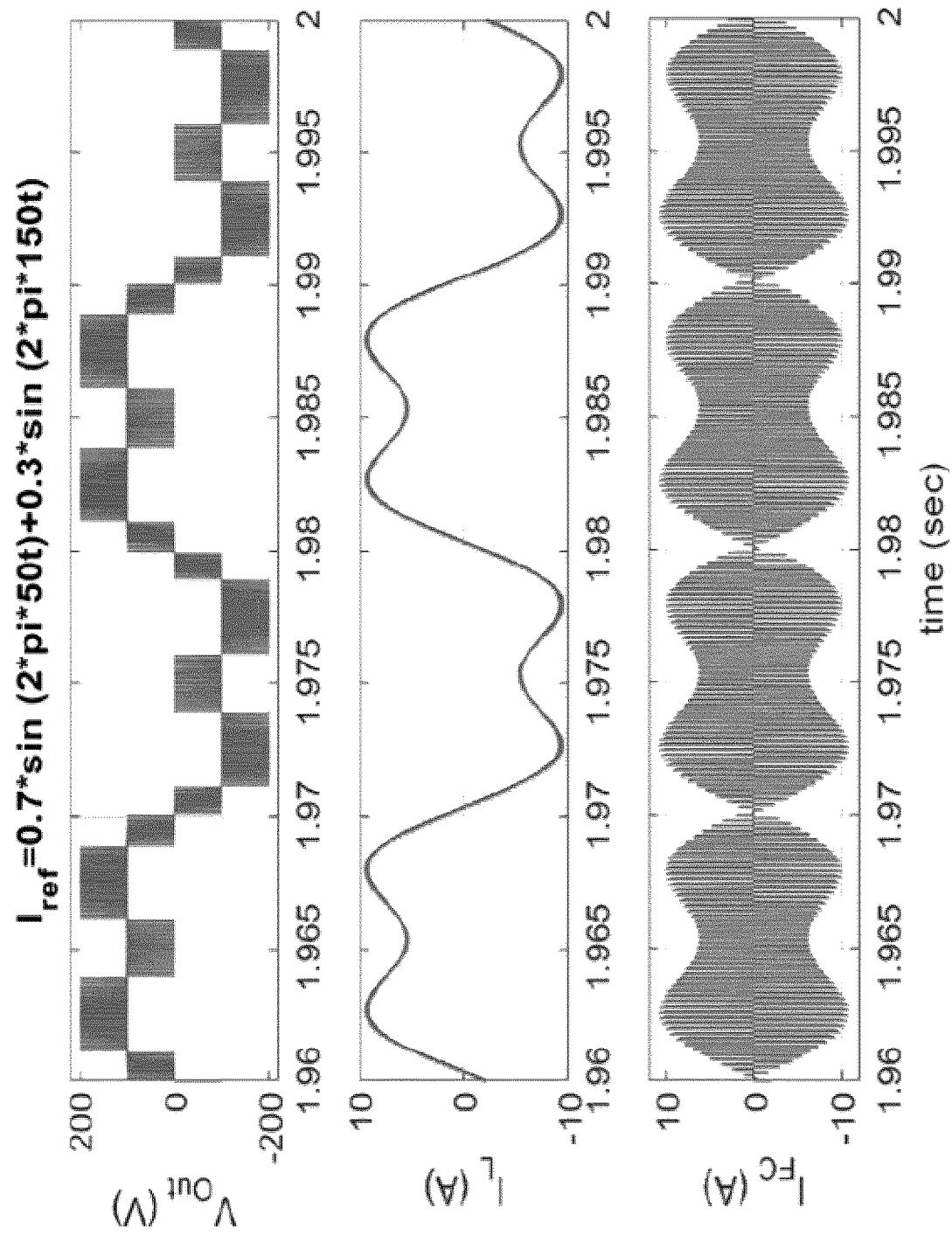
FIG. 8. Illustrates an example of the 5L ANPC converter output voltage and load current, as well as FC charging/discharging current for non-sinusoidal reference in accordance with one example of the present disclosure.

Moreover, the 5L ANPC converter output voltage and load current, as well as the FC charging/discharging current for $i_{ref}=0.7 \times \sin(2\pi \times 50 \: t)+0.3 \times \sin(2\pi \times 150 \: t)$ non-sinusoidal input reference are shown in FIG. 8 to evaluate the performance of the suggested single-carrier sensor-less modulation method for non-sinusoidal input references. As presented in FIG. 8, the suggested single-carrier sensor-less modulation method provides suitable output voltage and the FC is regulated to desired value at non-sinusoidal references.

Generally, Adjustable Speed Drive (ASD) Systems exploit Pulse width modulation (PWM) methods to provide improved output voltage waveform with less total harmonic distortion (THD). However, the rated voltage of a motor cannot be achieved by applying the sinusoidal PWM (SPWM) method in linear modulation region. Hence, to generate rated voltage at the output of ASD system, the SPWM method should operate in non-linear region also named as over-modulation region which leads to higher THD and distorted output voltage waveform (see A. M. Hava, R. J. Kerkman and T. A. Lipo, "Carrier-based PWM-VSI overmodulation strategies: analysis, comparison, and design," in IEEE Transactions on Power Electronics, vol. 13, no. 4, pp. 674-689, July 1998, doi: 10.1109/63.704136). Therefore, the third harmonic injection method is normally used in ASD systems to achieve higher amplitude of the output voltage without deteriorating the output voltage THD. In the proposed modulation scheme as presented in FIG. 8, the proposed switching pattern can also provide non-sinusoidal output voltage including the third harmonic injected reference voltage without losing sensor-less voltage balancing of the flying capacitor (FC) and the DC-link capacitors. Moreover, other applications of generating the non-sinusoidal reference signals are in active power filter (APF), dynamic voltage restorer (DVR).

Figure 9:
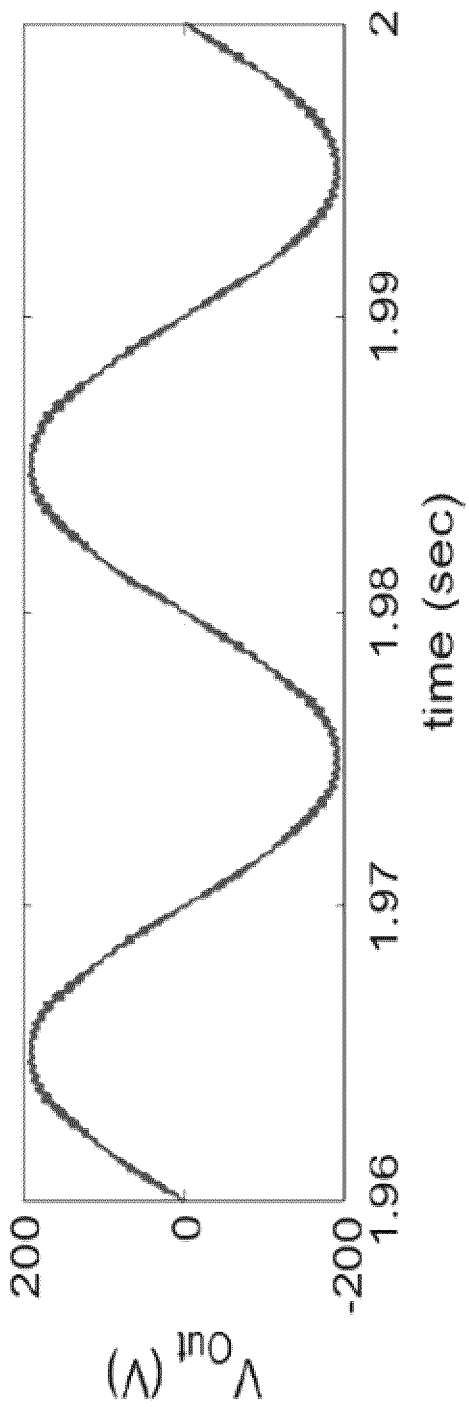
FIG. 9A illustrates the 5L ANPC converter output voltage after LC filter in accordance with one example of the present disclosure.
FIG. 9B shows the 5L ANPC converter FFT analysis in accordance with one example of the present disclosure.
Figure 9:
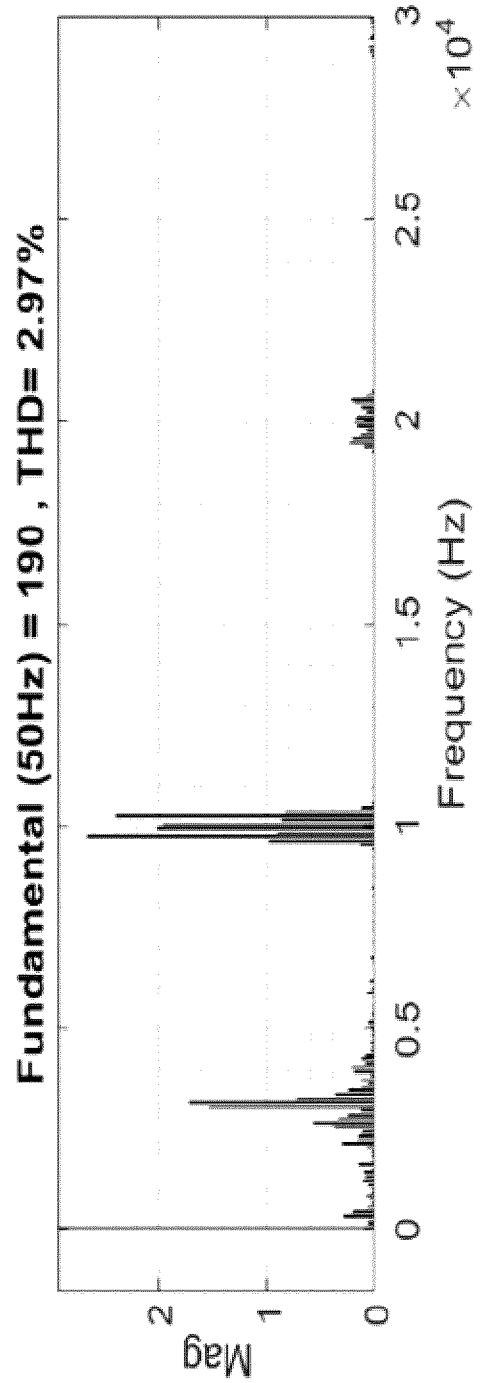

In addition, the output voltage of the 5L ANPC converter after designed output LC filter in (19) and (20) and its FFT analysis are shown in FIG. 9. As presented in FIG. 9, even though the values of utilized output LC filter inductor and capacitor are halved, the output voltage THD is only 2.97%.

Figure 10:
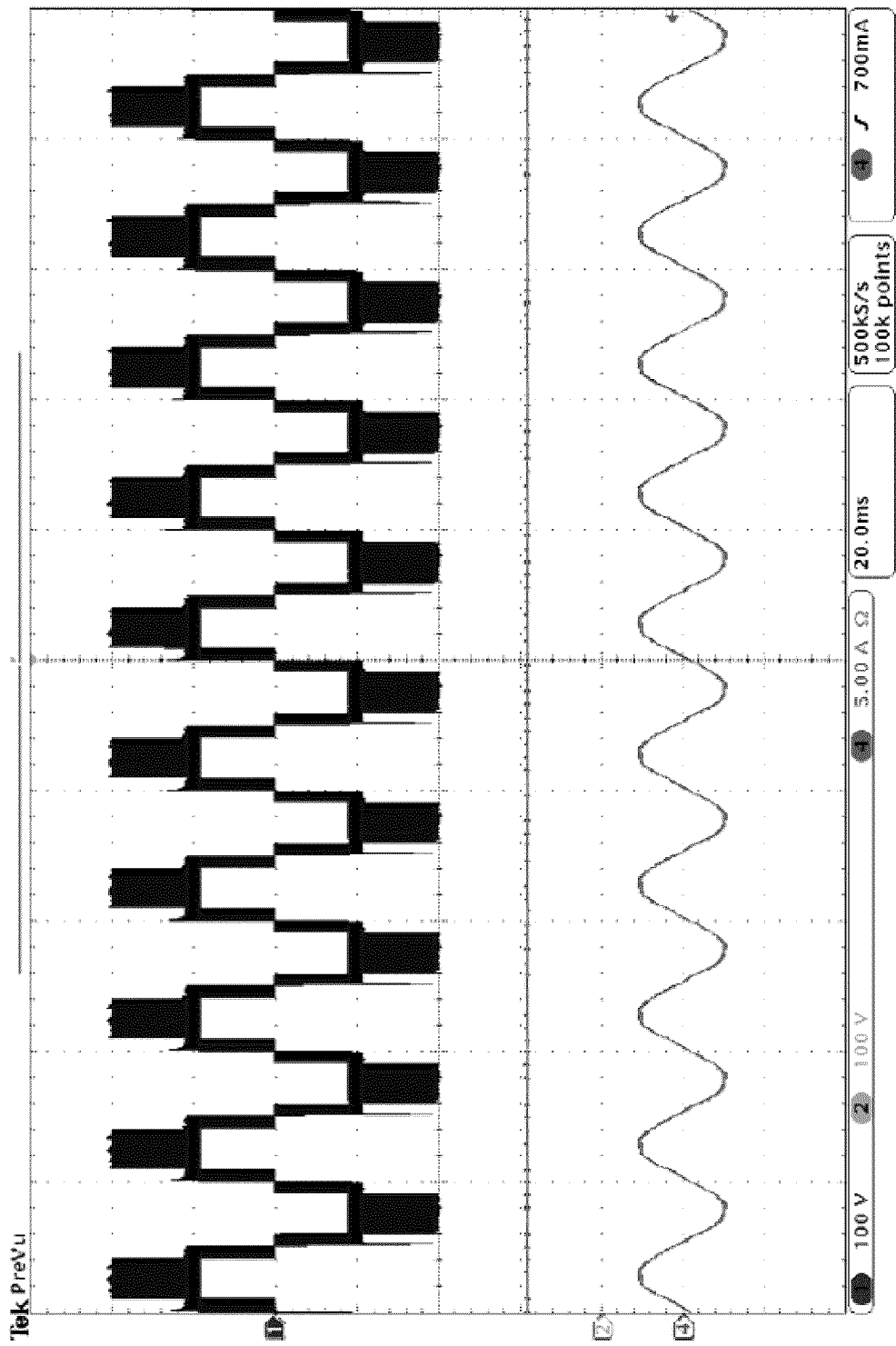
FIG. 10. is an Illustration of an example of the experimental results of the 5L ANPC converter controlled by the proposed single-carrier sensor-less modulation method showing the output voltage (Ch1: 100 volt/div), load current (Ch4: 5 Amp/div), and FC voltage (Ch2: 100 volt/div).

Moreover, the experimental setup of the 5L ANPC converter using eight BUP 314D IGBTs and their driver boards has been implemented in the laboratory. The low-cost ATMEL ATmega8 microcontroller has been used to implement the proposed single carrier sensor-less switching method and to control the 5L ANPC converter. The RL load is set to R=40Ω, L=20 mH and remaining parameters of the experimental prototype are illustrated in Table II. The experimental results of the 5L ANPC converter output voltage, FC voltage, and load current are presented in FIG. 10.

The match between simulation and experimental results verifies the viability and feasibility of the proposed single carrier sensor-less modulation method as well as the designed output LC filter for 5L ANPC converter.

The present disclosure provides a novel simplified single-carrier sensor-less PWM method and apparatus for the 5L ANPC converters. In one example, the suggested modulation method comprises only one PWM carrier signal and two logic functions. Moreover, the FC and dc-link capacitors voltages are automatically regulated to their desired values by employing the proposed modulation method.

Therefore, the proposed switching method was implemented on low-cost ATmega8 microcontroller. In addition, the frequency of first switching harmonic cluster is doubled and the values of the output LC filter inductor and capacitor are halved in compare to those values by employing the traditional switching methods.

Accordingly, applying the proposed modulation method to the 5L ANPC converter leads to notable reduction in control complexity, size, and cost of the 5L ANPC converter and remarkable increase the 5L ANPC converter power density.

References made in the above description are as follows:
[1] J. Rodriguez, S. Bernet, B. Wu, J. O. Pontt, and S. Kouro, "Multilevel Voltage-Source-Converter Topologies for Industrial Medium-Voltage Drives," IEEE Transactions on Industrial Electronics, vol. 54, no. 6, pp. 2930-2945, 2007.

[2] J. Rodriguez, L. Jih-Sheng, and P. Fang Zheng, "Multilevel inverters: a survey of topologies, controls, and applications," IEEE Transactions on Industrial Electronics, vol. 49, no. 4, pp. 724-738, 2002.

[3] M. Abarzadeh and H. M. Kojabadi, "A Static Ground Power Unit Based on the Improved Hybrid Active Neutral-Point-Clamped Converter," IEEE Transactions on Industrial Electronics, vol. 63, no. 12, pp. 7792-7803, 2016.

[4] R. Katebi, J. He, and N. Weise, "Investigation of Fault Tolerant Capabilities in an Advanced Three-Level Active T-Type Converter," IEEE Journal of Emerging and Selected Topics in Power Electronics, pp. 1-1, 2018.

[5] J. Rodriguez, S. Bernet, P. K. Steimer, and I. E. Lizama, "A Survey on Neutral-Point-Clamped Inverters," IEEE Transactions on Industrial Electronics, vol. 57, no. 7, pp. 2219-2230, 2010.

[6] F. Kieferndorf, M. Basler, L. A. Serpa, J. H. Fabian, A. Coccia, and G. A. Scheuer, "ANPC-5L technology applied to medium voltage variable speed drives applications," in SPEEDAM 2010, 2010, pp. 1718-1725.

[7] M. Abarzadeh, H. M. Kojabadi, and L. Chang, "A Modified Static Ground Power Unit Based on Novel Modular Active Neutral Point Clamped Converter," IEEE Transactions on Industry Applications, vol. 52, no. 5, pp. 4243-4256, 2016.

[8] H. R. Teymour, D. Sutanto, K. M. Muttaqi, and P. Ciufo, "Novel modulation and control strategy for five-level AN PC converter with unbalanced DC voltage applied to a single-phase grid connected PV system," in 2013 IEEE Industry Applications Society Annual Meeting, 2013, pp. 1-8.

[9] H. R. Teymour, D. Sutanto, K. M. Muttaqi, and P. Ciufo, "A Novel Modulation Technique and a New Balancing Control Strategy for a Single-Phase Five-Level ANPC Converter," IEEE Transactions on Industry Applications, vol. 51, no. 2, pp. 1215-1227, 2015.

[10] R. Katebi, J. He, and N. Weise, "An Advanced Three-Level Active Neutral-Point-Clamped Converter With Improved Fault-Tolerant Capabilities," IEEE Transactions on Power Electronics, vol. 33, no. 8, pp. 6897-6909, 2018.

[11] M. Abarzadeh, H. M. Kojabadi, F. Deng, and Z. Chen, "Enhanced static ground power unit based on flying capacitor based h-bridge hybrid activeneutral-point-clamped converter," IET Power Electronics, vol. 9, no. 12, pp. 2337-2349, 2016.

[12] N. Sandeep and U. R. Yaragatti, "Operation and Control of an Improved Hybrid Nine-Level Inverter," IEEE Transactions on Industry Applications, vol. 53, no. 6, pp. 5676-5686, 2017.

[13] M. Abarzadeh and K. Al-Haddad, "An Improved Active-Neutral-Point-Clamped Converter With New Modulation Method for Ground Power Unit Application," IEEE Transactions on Industrial Electronics, vol. 66, no. 1, pp. 203-214, 2019.

[14] P. Barbosa, P. Steimer, L. Meysenc, M. Winkelnkemper, J. Steinke, and N. Celanovic, "Active Neutral-Point-Clamped Multilevel Converters," in 2005 IEEE 36th Power Electronics Specialists Conference, 2005, pp. 2296-2301.

[15] S. Busquets-Monge and J. Nicolas-Apruzzese, "A Multilevel Active-Clamped Converter Topology—Operating Principle," IEEE Transactions on Industrial Electronics, vol. 58, no. 9, pp. 3868-3878, 2011.

[16] J. I. Leon, L. G. Franquelo, S. Kouro, B. Wu, and S. Vazquez, "Simple modulator with voltage balancing control for the hybrid five-level flyingcapacitor based ANPC converter," in 2011 IEEE International Symposium on Industrial Electronics, 2011, pp. 1887-1892.

[17] N. Oikonomou, C. Gutscher, P. Karamanakos, F. D. Kieferndorf, and T. Geyer, "Model Predictive Pulse Pattern Control for the Five-Level Active Neutral-Point-Clamped Inverter," IEEE Transactions on Industry Applications, vol. 49, no. 6, pp. 2583-2592, 2013.

[18] F. Kieferndorf, P. Karamanakos, P. Bader, N. Oikonomou, and T. Geyer, "Model predictive control of the internal voltages of a five-level active neutral point clamped converter," in 2012 IEEE Energy Conversion Congress and Exposition (ECCE), 2012, pp. 1676-1683.

[19] M. Abarzadeh and K. Al-Haddad, "An Improved Model Predictive Controller for Five-Level Active-Neutral-Point-Clamped Converter," in 2018 IEEE Electrical Power and Energy Conference (EPEC), 2018, pp. 1-6.

[20] K. Wang, L. Xu, Z. Zheng, and Y. Li, "Capacitor Voltage Balancing of a Five-Level ANPC Converter Using Phase-Shifted PWM," IEEE Transactions on Power Electronics, vol. 30, no. 3, pp. 1147-1156, 2015.

[21] M. Abarzadeh, H. M. Kojabadi, and L. Chang, "A modified static ground power unit based on active natural point clamped converter," in 2015 IEEE Energy Conversion Congress and Exposition (ECCE), 2015, pp. 3508-3514.

[22] Z. Liu, Y. Wang, G. Tan, H. Li, and Y. Zhang, "A Novel SVPWM Algorithm for Five-Level Active Neutral-Point-Clamped Converter," IEEE Transactions on Power Electronics, vol. 31, no. 5, pp. 3859-3866, 2016.

[23] C. Li, S. Wang, Q. Guan, and D. Xu, "Hybrid Modulation Concept for Five-Level Active-Neutral-Point-Clamped Converter," IEEE Transactions on Power Electronics, vol. 32, no. 12, pp. 8958-8962, 2017.

What is claimed is:

1. A multi-level power inverter having a DC input and at least one AC phase output comprising for each one of said at least one AC phase output:
   two DC capacitors connected in series with said DC input, said DC capacitors, in operation, being charged to one half of a voltage of said DC input;
   a ground or neutral terminal connected to a midpoint between said two DC capacitors connected in series;
   a pair of power switches S3 connected in series across a first one of said two DC capacitors;
   a pair of power switches S4 connected in series across a second one of said two DC capacitors;
   a flying capacitor, in operation, being charged to one quarter of a voltage of said DC input;
   a pair of power switches S2, a first one of said power switches S2 connected between a midpoint between said power switches S3 and a first terminal of said flying capacitor and a second one of said power switches S2 connected between a midpoint between said power switches S4 and a second terminal of said flying capacitor;
   a pair of power switches S1, a first one of said power switches S1 connected between the first terminal of said flying capacitor and one of said at least one AC phase output, and a second one of said power switches S1 connected between the second terminal of said flying capacitor and said one of said at least one AC phase output; and
   a modulator having an input for receiving a reference waveform signal and gate signal outputs connected to each of said pairs of power switches S1 through S4, wherein said modulator, in operation, produces said gate signal outputs without sensor feedback, cause the flying capacitor to be equally charged and discharged in each pulse-width modulation period for voltage balancing of the flying capacitor, and causes the switching time of said pairs of power switches S3 and S4 to be equal to balance the voltages on said two DC capacitors while canceling odd multiples of a switching harmonic cluster frequency and doubling the switching harmonic cluster frequency.

2. The multi-level power inverter as defined in claim 1, wherein said modulator comprises:
at least one zero-crossing detector;
two logic function circuits; and
a single carrier signal source.

3. The multi-level power inverter as defined in claim 1, wherein said modulator comprises a processor and memory storing instructions that when executed by the processor generate a sequence of said gate signal outputs in accordance with said reference waveform signal.

4. The multi-level power inverter as defined in claim 3, wherein said modulator input comprises waveform characteristic data of said reference waveform signal.

5. The multi-level power inverter as defined in claim 1, wherein said at least one AC phase output comprises three AC phase outputs, said reference waveform signal comprising three reference waveform signals having phases separated by 120 degrees and a common frequency and amplitude.

6. The multi-level power inverter as defined in claim 1, further comprising an LC filter connected to said one of said at least one AC phase output.

7. A multi-level power rectifier having a DC output and at least one AC phase input comprising:
two DC capacitors connected in series with said DC output, said DC capacitors, in operation, being charged to one half of a voltage of said DC output;
for each one of said at least one AC phase input:
a ground or neutral terminal connected to a midpoint between said two DC capacitors connected in series;
a pair of power switches S3 connected in series across a first one of said two DC capacitors;
a pair of power switches S4 connected in series across a second one of said two DC capacitors;
a flying capacitor, in operation, being charged to one quarter of a voltage of said DC output;
a pair of power switches S2, a first one of said power switches S2 connected between a midpoint between said power switches S3 and a first terminal of said flying capacitor and a second one of said power switches S2 connected between a midpoint between said power switches S4 and a second terminal of said flying capacitor;
a pair of power switches S1, a first one of said power switches S1 connected between the first terminal of said flying capacitor and one of said at least one AC phase input, and a second one of said power switches S1 connected between the second terminal of said flying capacitor and said one of said at least one AC phase input; and
a current controller receiving phase and current measurements from said at least one AC phase input, a desired DC voltage signal and producing at least one reference waveform signal for each of said at least one AC phase input;
a modulator having an input for receiving said at least one reference waveform signal for each of said at least one AC phase input and having gate signal outputs connected to each of said pairs of power switches S1 through S4, wherein said modulator, in operation, produces said gate signal outputs without sensor feedback, cause the flying capacitor to be equally charged and discharged in each pulse-width modulation period for voltage balancing of the flying capacitor, and causes the switching time of said pairs of power switches S3 and S4 to be equal to balance the voltages on said two DC capacitors while canceling odd multiples of a switching harmonic cluster frequency and doubling the switching harmonic cluster frequency.

8. The multi-level power rectifier as defined in claim 7, wherein said modulator comprises:
at least one zero-crossing detector;
two logic function circuits; and
a single carrier signal source.

9. The multi-level power rectifier as defined in claim 7, wherein said modulator comprises a processor and memory storing instructions that when executed by the processor generate a sequence of said gate signal outputs in accordance with said at least one reference waveform signal.

10. The multi-level power rectifier as defined in claim 9, wherein said modulator input comprises waveform characteristic data of at least one said reference waveform signal.

11. The multi-level power rectifier as defined in claim 7, wherein said at least one AC phase input comprises three AC phase inputs, said reference waveform signal comprising three reference waveform signals having phases separated by 120 degrees and a common frequency and amplitude.

12. The multi-level power rectifier as defined in claim 7, further comprising grid filter connected to said one of said at least one AC phase input.

13. The multi-level power rectifier as defined in claim 12, wherein said grid filter comprises an inductance and a resistance for each one of said at least one AC phase input.

14. A motor controller comprising:
a rectifier for converting AC power to DC power;
a multi-level power inverter connected to said rectifier, said multi-level power inverter having a DC input and at least one AC phase output comprising for each one of said at least one AC phase output:
two DC capacitors connected in series with said DC input, said DC capacitors, in operation, being charged to one half of a voltage of said DC input;
a ground or neutral terminal connected to a midpoint between said two DC capacitors connected in series;
a pair of power switches S3 connected in series across a first one of said two DC capacitors;
a pair of power switches S4 connected in series across a second one of said two DC capacitors;
a flying capacitor, in operation, being charged to one quarter of a voltage of said DC input;
a pair of power switches S2, a first one of said power switches S2 connected between a midpoint between said power switches S3 and a first terminal of said flying capacitor and a second one of said power switches S2 connected between a midpoint between said power switches S4 and a second terminal of said flying capacitor;
a pair of power switches S1, a first one of said power switches S1 connected between the first terminal of said flying capacitor and one of said at least one AC phase output, and a second one of said power switches S1 connected between the second terminal of said flying capacitor and said one of said at least one AC phase output; and
a modulator having an input for receiving a reference waveform signal and gate signal outputs connected to each of said pairs of power switches S1 through S4, wherein said modulator, in operation, produces said gate signal outputs without sensor feedback, cause the flying capacitor to be equally charged and discharged in each pulse-width modulation period for voltage balancing of the flying capacitor, and causes the switching time of said pairs of power switches S3 and S4 to be equal to balance the voltages on said two DC capacitors while canceling odd multiples of a switching harmonic cluster frequency and doubling the switching harmonic cluster frequency; and a controller connected to a motor sensor and to said input of said modulator input for providing said a reference waveform signal.

15. The motor controller as defined in claim 14, wherein said rectifier comprises a multi-level rectifier for converting AC power to DC power having a DC output and at least one AC phase input comprising:

two DC capacitors connected in series with said DC output, said DC capacitors, in operation, being charged to one half of a voltage of said DC output;

for each one of said at least one AC phase input:

a ground or neutral terminal connected to a midpoint between said two DC capacitors connected in series;

a pair of power switches S3 connected in series across a first one of said two DC capacitors;

a pair of power switches S4 connected in series across a second one of said two DC capacitors;

a flying capacitor, in operation, being charged to one quarter of a voltage of said DC output;

a pair of power switches S2, a first one of said power switches S2 connected between a midpoint between said power switches S3 and a first terminal of said flying capacitor and a second one of said power switches S2 connected between a midpoint between said power switches S4 and a second terminal of said flying capacitor;

a pair of power switches S1, a first one of said power switches S1 connected between the first terminal of said flying capacitor and one of said at least one AC phase input, and a second one of said power switches S1 connected between the second terminal of said flying capacitor and said one of said at least one AC phase input; and a current controller receiving phase and current measurements from said at least one AC phase input, a desired DC voltage signal and producing at least one reference waveform signal for each of said at least one AC phase input:

a modulator having an input for receiving said at least one reference waveform signal for each of said at least one AC phase input and having gate signal outputs connected to each of said pairs of power switches S1 through S4, wherein said modulator, in operation, produces said gate signal outputs without sensor feedback, cause the flying capacitor to be equally charged and discharged in each pulse-width modulation period for voltage balancing of the flying capacitor, and causes the switching time of said pairs of power switches S3 and S4 to be equal to balance the voltages on said two DC capacitors while canceling odd multiples of a switching harmonic cluster frequency and doubling the switching harmonic cluster frequency.

* * * * *